US008899849B2

(12) United States Patent
Wada et al.

(10) Patent No.: US 8,899,849 B2
(45) Date of Patent: Dec. 2, 2014

(54) CAMERA APPARATUS AND METHOD OF CONTROLLING CAMERA APPARATUS

(71) Applicant: Panasonic Corporation, Osaka (JP)

(72) Inventors: Jyouji Wada, Kanagawa (JP); Yoshihito Urashima, Fukuoka (JP); Masahito Oka, Fukuoka (JP); Yuuya Jikihara, Fukuoka (JP); Hirofumi Enomoto, Fukuoka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/188,752

(22) Filed: Feb. 25, 2014

(65) Prior Publication Data

US 2014/0248045 A1    Sep. 4, 2014

(30) Foreign Application Priority Data

Mar. 1, 2013   (JP) ................................. 2013-041211
Mar. 14, 2013  (JP) ................................. 2013-051990
Aug. 26, 2013  (JP) ................................. 2013-174519
Aug. 26, 2013  (JP) ................................. 2013-174520
Sep. 26, 2013  (JP) ................................. 2013-199860

(51) Int. Cl.
G03B 17/00   (2006.01)
G03B 17/56   (2006.01)
G03B 11/04   (2006.01)

(52) U.S. Cl.
CPC ............ *G03B 11/048* (2013.01); *G03B 17/561* (2013.01)
USPC ....................................................... 396/427

(58) Field of Classification Search
USPC ................................................ 396/427, 510
See application file for complete search history.

(56) References Cited

U.S. PATENT DOCUMENTS

| 4,764,008 | A  | * | 8/1988 | Wren ............................ 396/427 |
| 4,920,367 | A  | * | 4/1990 | Pagano ......................... 396/427 |
| 4,999,664 | A  | * | 3/1991 | Foust ............................. 396/26 |
| 5,765,043 | A  | * | 6/1998 | Tyler .............................. 396/12 |
| 6,984,078 | B2 | * | 1/2006 | Inoue et al. .................... 396/510 |
| 7,934,876 | B2 | * | 5/2011 | Fujiwara ....................... 396/448 |

(Continued)

FOREIGN PATENT DOCUMENTS

JP   2004-325518   11/2004
JP   2006-325070   11/2006

(Continued)

OTHER PUBLICATIONS

Partial International Search Report in PCT/JP2014/055889, mail date is Jun. 30, 2014.

*Primary Examiner* — W B Perkey
(74) *Attorney, Agent, or Firm* — Greenblum & Bernstein, P.L.C.

(57) ABSTRACT

A camera apparatus includes: a cover that has transparency; a rotatable camera unit that is provided inside the cover; a shade plate portion that includes a shade plate capable of partially shading light incident on the camera unit, wherein a position of the shade plate is rotatable; a control unit that is configured to control rotation of the camera unit and the position of the shade plate; and a memory that stores posture information including an imaging direction of the camera unit and positional information on the shade plate in association with each other. The control unit controls a direction of the camera unit based on the posture information stored in the memory and controls the position of the shade plate based on the positional information on the shade plate stored in the memory.

20 Claims, 36 Drawing Sheets

(56) References Cited

U.S. PATENT DOCUMENTS

| | | | |
|---|---|---|---|
| 2003/0194230 A1* | 10/2003 | Tamura | 396/427 |
| 2005/0018074 A1 | 1/2005 | Nakamoto et al. | |
| 2005/0259985 A1* | 11/2005 | Mulvey et al. | 396/427 |
| 2007/0116458 A1* | 5/2007 | McCormack | 396/427 |
| 2007/0292121 A1* | 12/2007 | Sato | 396/144 |
| 2009/0028542 A1* | 1/2009 | Nakamoto et al. | 396/427 |
| 2009/0073388 A1 | 3/2009 | Dumm | |
| 2009/0080878 A1 | 3/2009 | Cirker | |
| 2009/0269048 A1* | 10/2009 | Suzuki | 396/510 |
| 2010/0158503 A1 | 6/2010 | Fujiwara | |
| 2011/0025861 A1 | 2/2011 | Dumm | |
| 2011/0026913 A1 | 2/2011 | Dumm | |
| 2011/0103786 A1 | 5/2011 | Cirker | |
| 2012/0169870 A1* | 7/2012 | Jain et al. | 348/143 |
| 2012/0263446 A1 | 10/2012 | Dumm | |
| 2013/0223834 A1 | 8/2013 | Jikihara et al. | |
| 2013/0272690 A1* | 10/2013 | Aoki et al. | 396/257 |

FOREIGN PATENT DOCUMENTS

| | | |
|---|---|---|
| JP | 2010-085436 | 4/2010 |
| JP | 2012-103452 | 5/2012 |
| WO | 2009/039385 | 3/2009 |

* cited by examiner

FIG.6

| PRESET NUMBER | POSTURE INFORMATION ||| SHADE PLATE PORTION INFORMATION |
|---|---|---|---|---|
| | P | T | Z | F | M (%) |
| 1 | P1 | T1 | Z1 | F1 | 10 |
| 2 | P2 | T2 | Z2 | F2 | 0 |
| 3 | P3 | T3 | Z3 | F3 | 30 |
| n | Pn | Tn | Zn | Fn | θ   θ = F (BRIGHTNESS D/N) |

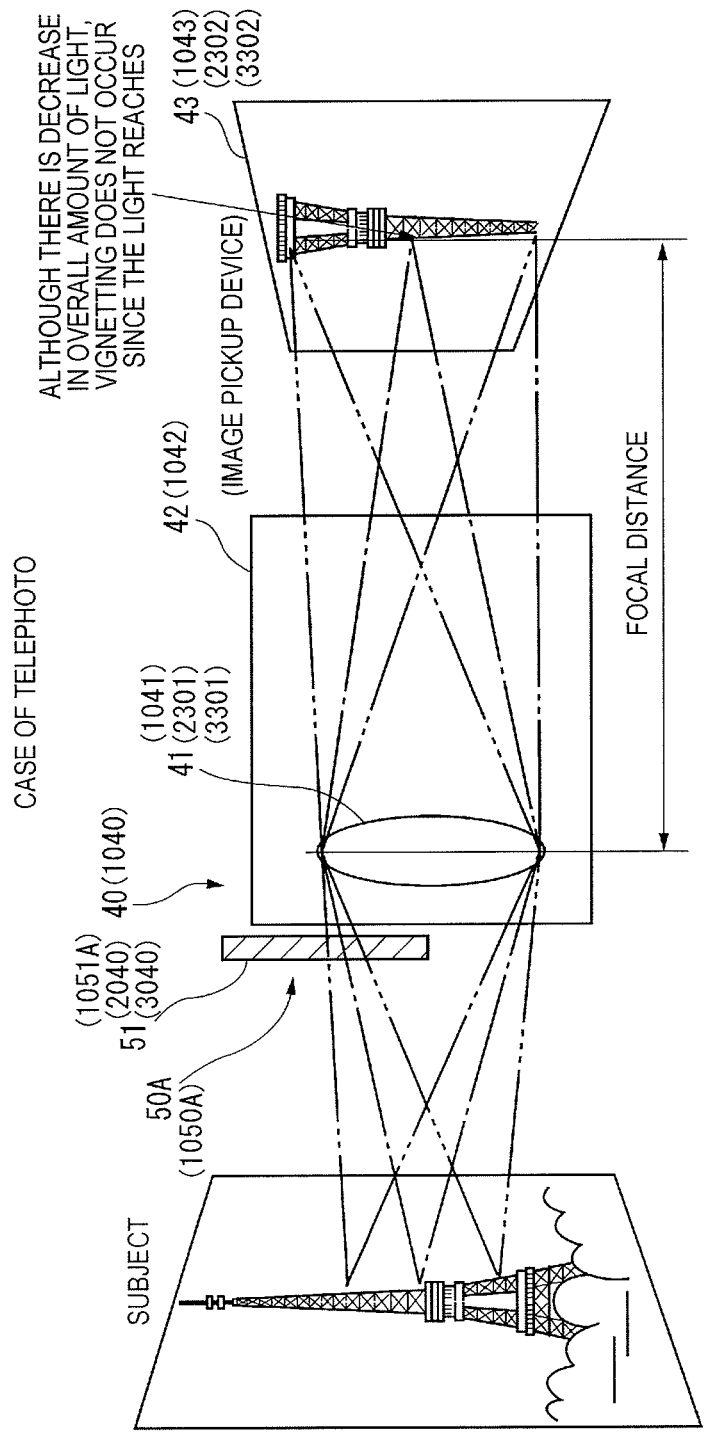

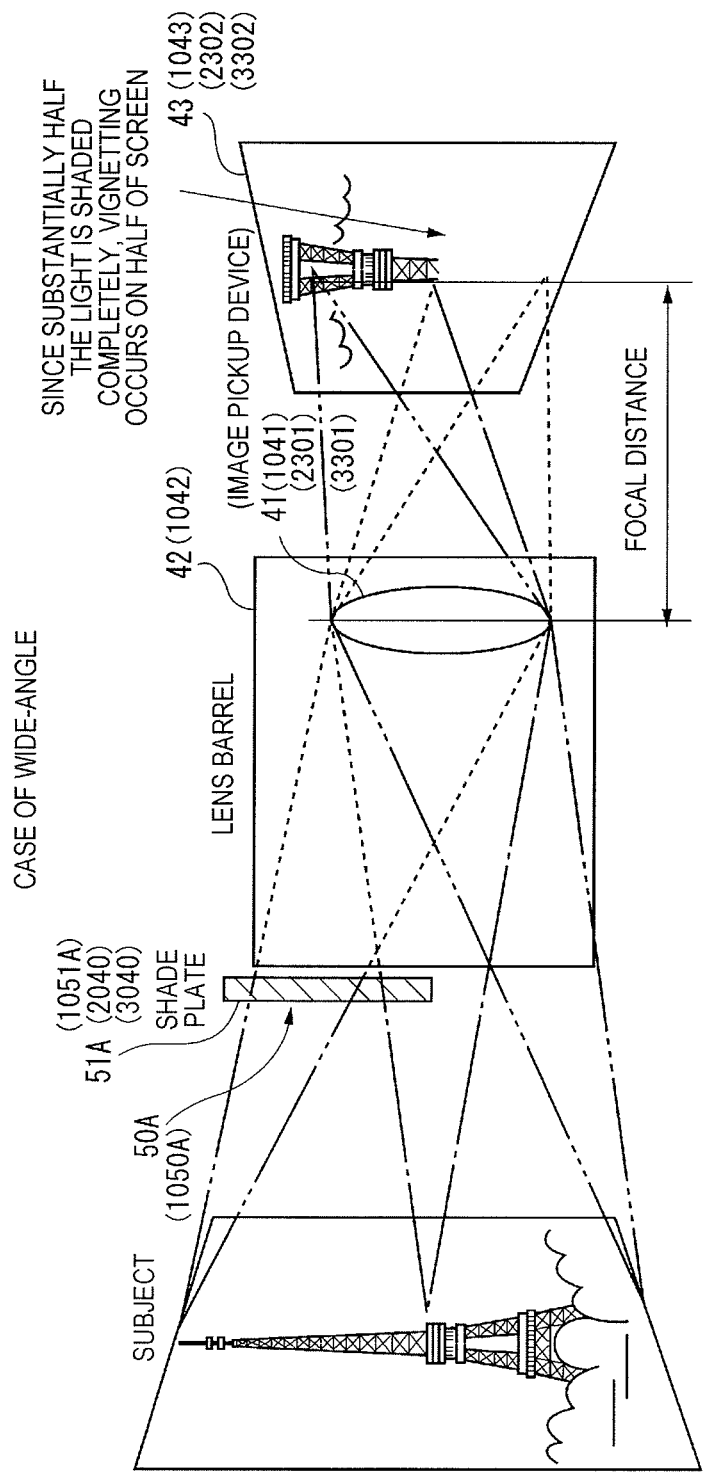

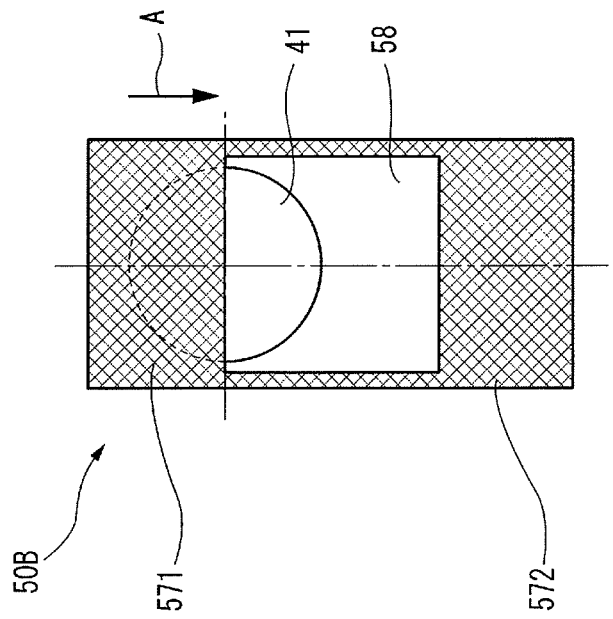
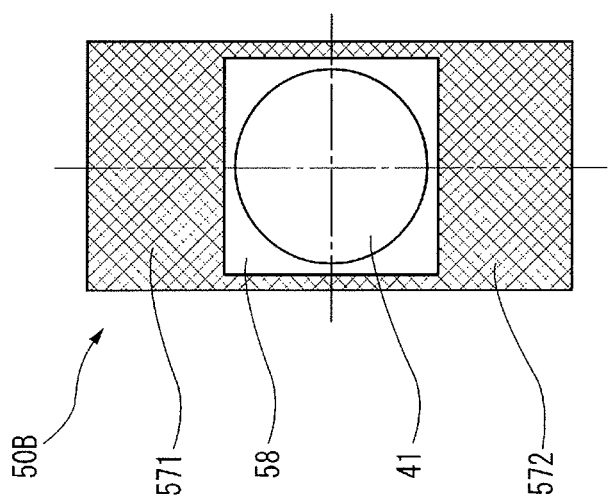

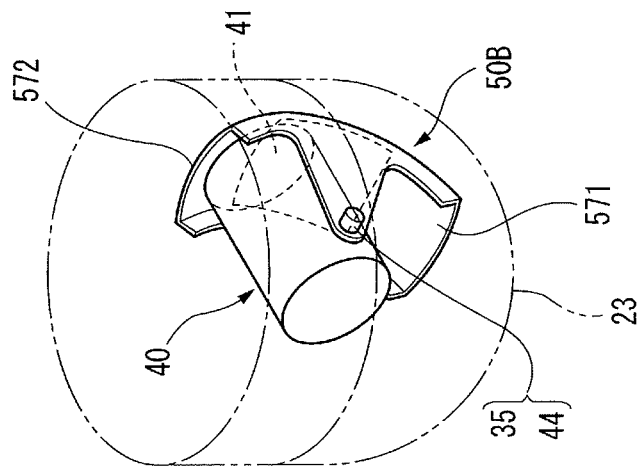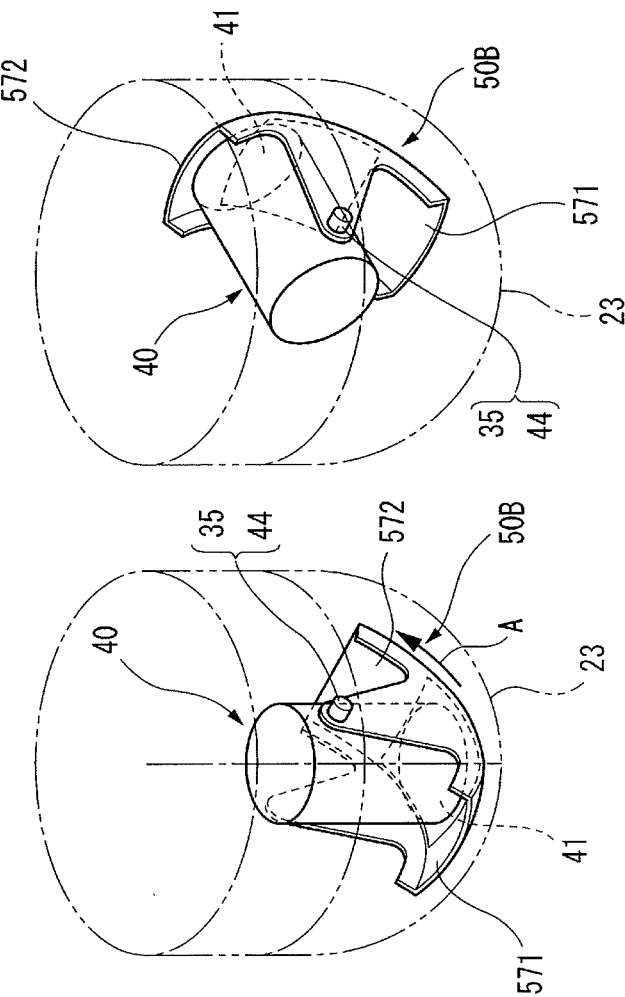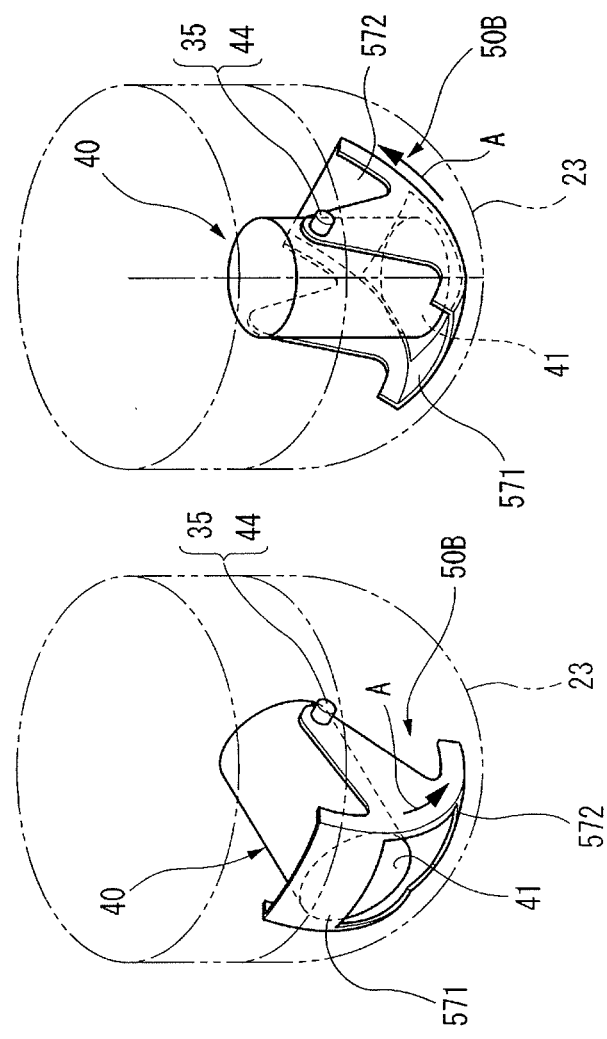

CAMERA APPARATUS AND METHOD OF CONTROLLING CAMERA APPARATUS

BACKGROUND

1. Field of the Invention

The present invention relates to a camera apparatus that has a function to rotate a camera lens in a pan direction or a tilt direction and a method of controlling a camera apparatus.

2. Description of the Related Art

In the related art, in camera apparatuses such as a monitoring camera, it is generally accepted that a camera lens is rotated in a pan direction and a tilt direction for capturing images (for example, refer to JP-A-2012-103452).

As illustrated in FIG. 17, a dome-type camera 100 disclosed in JP-A-2012-103452 includes a hemispherical dome cover 101. Inside the dome cover 101, a lens unit 103 having a camera lens 102 is accommodated.

In the dome-type camera 100, there are provided a pan motor and a tilt motor. The lens unit 103 is rotatable in the pan direction and the tilt direction.

In this dome-type camera 100, in order to prevent vignetting from generating when capturing images in a direction at a wide tilt angle (direction close to horizontal direction), the lens unit 103 is offset from the center of the spherical dome cover 101 to an apex direction. If the lens unit 103 is offset from the center of the spherical dome cover 101, aberration occurs due to a lens effect of the dome cover 101. This aberration causes images to be projected in an overlapping manner, thereby being deteriorated in image quality as the photograph in FIG. 18B.

This phenomenon still occurs, even if the lens unit 103 is not offset, when a cylindrical portion is provided on an upper side of a hemispherical portion of the dome cover 101 as in FIG. 18A. This is because when the lens unit 103 is at an angle close to the horizontal level, penetration angle α1 of light L1 penetrating the dome cover 101 on an upper side of an optical axis CBM and penetration angle α2 of light L2 penetrating the dome cover 101 on a lower side thereof are different from each other, causing positions of focal points F1 and F2 to deviate from each other.

In order to improve this deterioration in the image quality, a partial shade filter 104 is included in the lens unit 103. An arc-shaped guide portion 105 is provided in an end portion of the partial shade filter 104 through a support piece 106. Two guide pins 107 are respectively provided on each of side surfaces of the guide portion 105 on the right and left. A pair of guide plates 108 are provided in an upper portion of the lens unit 103 on the right and left. The guide pin 107 of the guide portion 105 is inserted into an arc-shaped long hole 109 which is provided in the guide plate 108 in a slidable manner.

Accordingly, the partial shade filter 104 reciprocates between an insertion position and a retreat position and blocks one side of light incident on an image pickup device, and thus, it is possible to prevent the overlapping of the images.

SUMMARY

However, in a camera apparatus (dome-type camera 100) in the related art, a partial shade filter 104 is able to reciprocate between an insertion position and a retreat position to be selected therebetween. Therefore, when imaging at a wide tilt angle and a direction close to a horizontal direction, although the partial shade filter 104 can be disposed in the insertion position, it is not possible to control an amount of insertion in response to a monitoring direction or a monitoring subject, thereby resulting in a problem such as being too dark, for example, in that the most suitable image cannot be obtained.

A non-limited object of the present invention is to provide a camera apparatus that can obtain the most suitable image by adjusting a shading rate, thereby achieving improvement in monitoring ability, and a method of controlling a camera apparatus.

A first aspect of the present invention provides a camera apparatus including: a cover that has transparency; a rotatable camera unit that is provided inside the cover; a shade plate portion that includes a shade plate capable of partially shading light incident on the camera unit, wherein a position of the shade plate is rotatable; a control unit that is configured to control rotation of the camera unit and the position of the shade plate; and a memory that stores posture information including an imaging direction of the camera unit and positional information on the shade plate in association with each other, wherein the control unit controls a direction of the camera unit based on the posture information stored in the memory and controls the position of the shade plate based on the positional information on the shade plate stored in the memory.

A second aspect of the present invention provides a method of controlling a camera apparatus, the method including: rotating a position of a shade plate that partially shades light incident on a rotatable camera unit which is provided inside a cover having transparency; controlling rotation of the camera unit and a position of the shade plate; and storing posture information including an imaging direction of the camera unit and positional information on the shade plate, wherein a direction of the camera unit is controlled based on the stored posture information, and the position of the shade plate is controlled based on the stored positional information.

A third aspect of the present invention provides a camera apparatus including: a cover that has transparency; a rotatable camera unit that is provided inside the cover; and a shade plate portion that includes a plurality of shade plates partially shade light incident on the camera unit, wherein each position of the plurality of shade plates are rotatable, wherein the camera unit is disposed in a position where the light is incident on the camera unit from between the plurality of shade plates.

A fourth aspect of the present invention provides a method of controlling a camera apparatus, wherein a camera unit is disposed between a plurality of shade plates that partially shade light incident on a rotatable camera unit which is provided inside a cover having transparency, and the method includes a step of rotating positions of a plurality of shade plates.

A fifth aspect of the present invention provides a camera apparatus including: an outer dome cover that has transparency; a camera unit that is provided inside the outer dome cover and rotatable in a tilt direction; a pan table to which the camera unit is attached, wherein the pan table is rotatable in a pan direction; a shade plate that partially shades light incident on the camera unit; and a shade plate elevating unit that is attached to the pan table and supports the shade plate to be movable in an orthogonal direction with respect to the pan table.

A sixth aspect of the present invention provides a method of controlling a camera apparatus, the method including: elevating a position of a shade plate that partially shades light incident on a rotatable camera unit which is provided inside an outer dome cover having transparency with respect to a pan table rotatable in a pan direction; and controlling rotation of the camera unit and an elevating position of the shade plate with respect to the pan table.

A seventh aspect of the present invention provides a camera apparatus including: a body to be attached to an attachment surface; an outer dome cover that has transparency attached to the body; a camera unit that is provided inside the outer dome cover and rotatable in a tilt direction; a pan table to which the camera unit is attached, wherein the pan table is rotatable in a pan direction; a cylindrical shade plate that is attached to the body to be elevated and partially shades light incident on the camera unit; and a shade plate elevating unit that is attached to the body and supports the shade plate to be movable in an orthogonal direction with respect to the pan table.

An eighth aspect of the present invention provides a method of controlling a camera apparatus, the method including: elevating a position of a cylindrical shade plate that partially shades light incident on a camera unit which is rotatable in a tilt direction with respect to a body attached to an attachment surface; and controlling an elevating position of the shade plate in response to rotation of the camera unit.

BRIEF DESCRIPTION OF THE DRAWINGS

FIG. 6 is a table illustrating data which is stored in a memory.

FIG. 8 is an explanatory view illustrating an image in a state where a portion of a front surface of a telephoto lens is covered.

FIG. 9 is an explanatory view illustrating the image in a state where a portion of a front surface of a wide-angle lens is covered.

FIG. 12A is a front view illustrating a position of the shade plate portion in a retreat state.

FIG. 12B is a front view illustrating a position of the shade plate portion in a covered state.

FIG. 13A is a perspective view illustrating interlocking between the camera unit and the shade plate portion in a state of being oriented in one horizontal direction.

FIG. 13B is a perspective view illustrating interlocking between the camera unit and the shade plate portion during the camera unit rotates.

FIG. 13C is a perspective view illustrating interlocking between the camera unit and the shade plate portion in a state of being oriented in the opposite horizontal direction.

DETAILED DESCRIPTION

Hereinafter, a camera apparatus according to each exemplary embodiment of the present invention will be described with reference to the accompanying drawings.

(First Embodiment)

Figure 1:
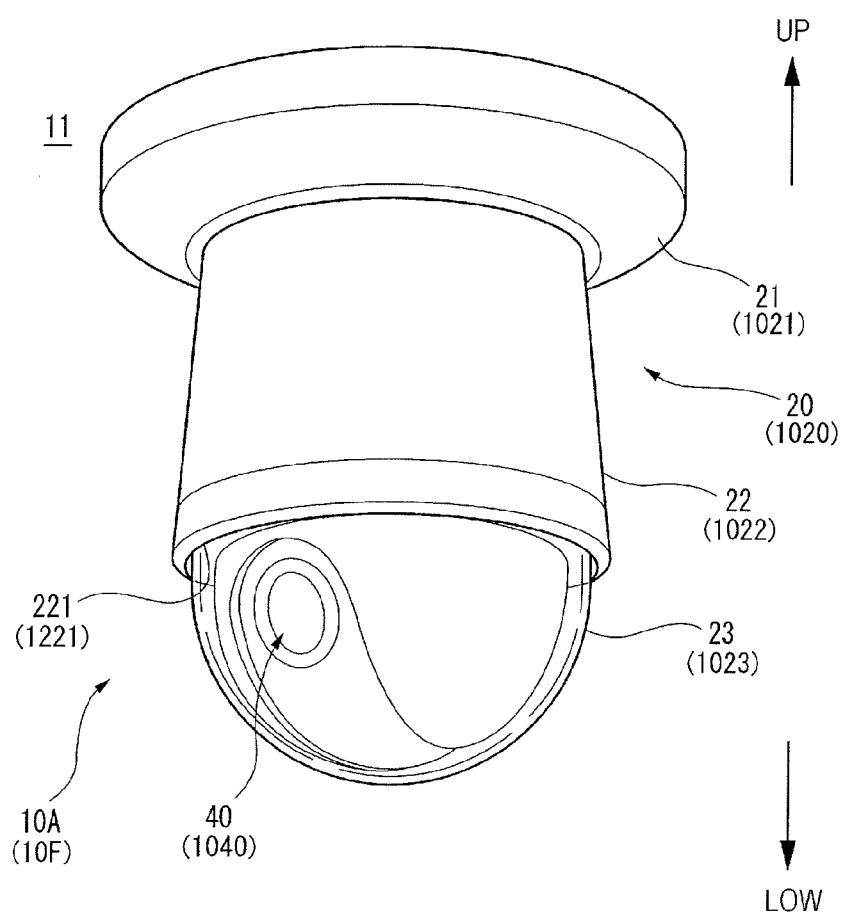
FIG. 1 is an overall perspective view of a camera apparatus seen from below according to a first embodiment of the present invention.

As illustrated in FIG. 1, a camera apparatus 10A according to a first embodiment is, for example, attached to a ceiling surface 11 which is an attachment surface of another member and can be used as a monitoring camera which can monitor lower regions by 360 degrees from the ceiling surface 11.

In the description below, it is considered that the ceiling surface 11 is an upper side and the opposite side of the ceiling surface 11 is the lower side.

The camera apparatus 10A has a body (a camera body) 20 which can be attached to the ceiling surface 11. The body 20 has a disk-shaped base 21 which is attached to the ceiling surface 11, an approximately cylindrical accommodation portion 22 which is attached to a lower side of the base 21, and a transparent hemispherical cover 23 covers an opening 221 of the accommodation portion 22.

Figure 2:
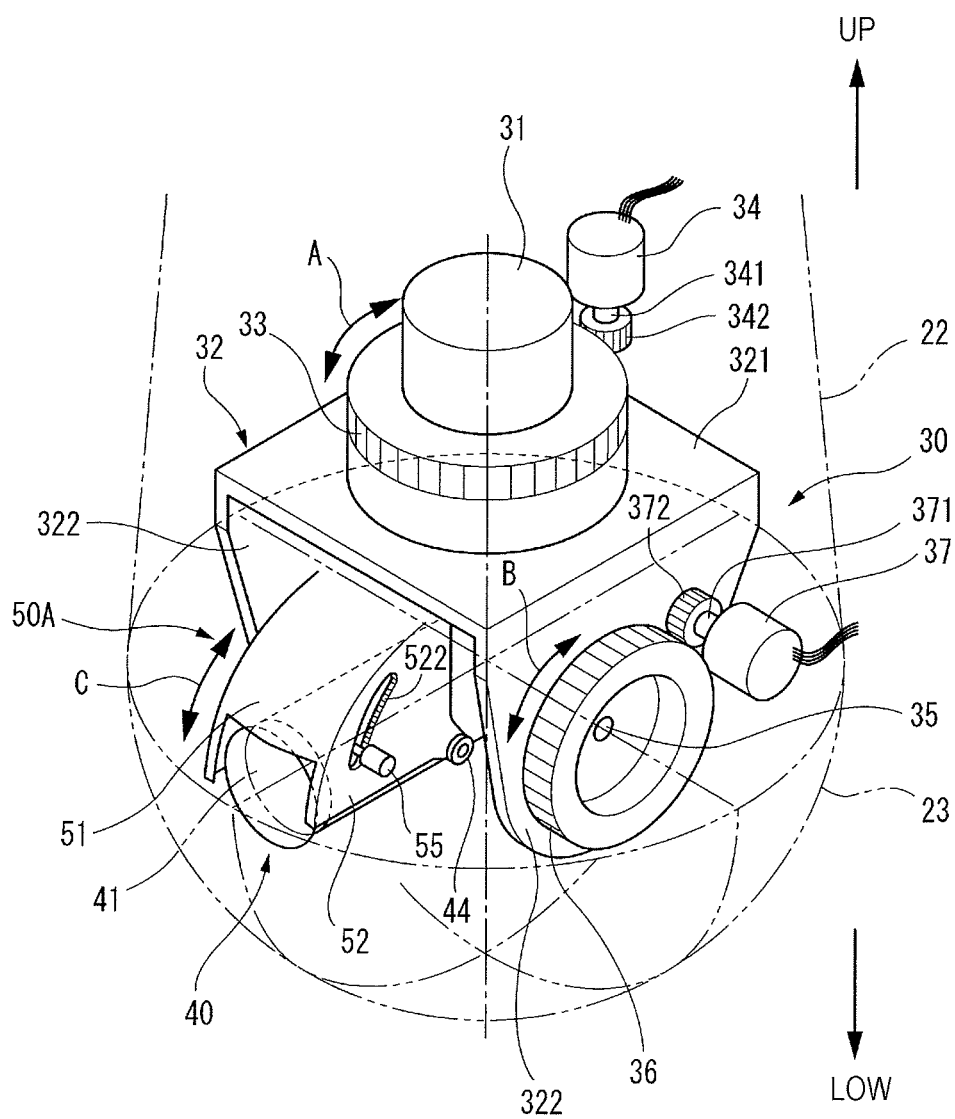
FIG. 2 is a perspective view of a mechanism which is accommodated in a body of the camera apparatus seen from above according to the first embodiment of the present invention seen from above.

As illustrated in FIG. 2, an inner mechanism 30 is accommodated in the body 20. The inner mechanism 30 accommodated in the accommodation portion 22 of the body 20 has a first rotating shaft 31 which is accommodated in the accommodation portion 22 and is perpendicular to the ceiling surface 11.

A support member 32, which is rotatable in an arrow A direction with respect to the body 20 about the first rotating shaft 31, is attached to a lower end portion of the first rotating shaft 31. An upper end portion of the first rotating shaft 31 is fixed to an upper portion of the base 21 or the accommodation portion 22.

The support member 32 exhibits an angular U-shape in its entirety and has a top plate 321 and a facing pair of side plates 322 and 322 which extend downward from the top plate 321. A gear portion 33 having larger diameter than the first rotating shaft 31 is provided around the first rotating shaft 31 on an upper side of the top plate 321 so as to rotate integrally with the support member 32.

A first motor 34 is attached to the accommodation portion 22 of the body 20. A gear 342 which meshes with the gear portion 33 is attached to a rotational shaft 341 of the first motor 34.

Therefore, the gear portion 33 is controlled in rotation by the first motor 34, and the support member 32 is controlled in the rotating in the arrow A direction of FIG. 2. The first motor 34 is connected to a control unit 70 described below (refer to FIG. 5).

A second rotating shaft 35 which is orthogonal to the first rotating shaft 31 is provided to be rotatable with respect to the support member 32 in each of the pair of side plates 322 and 322 of the support member 32. A camera unit 40 is integrally provided between a pair of the second rotating shafts 35 and 35. Therefore, the camera unit 40 is rotatable with the pair of the second rotating shafts 35 and 35 with respect to the side plates 322.

The second rotating shaft 35 is provided horizontally, and has a gear portion 36 in a tip of one of the second rotating shafts 35. The gear portion 36 rotates integrally with the second rotating shaft 35.

A second motor 37 is attached to the support member 32. A gear 372 which meshes with the gear portion 36 is attached to a rotational shaft 371 of the second motor 37. The gear portion 36 is controlled by the second motor 37, and the camera unit 40 is controlled in rotating in a vertical direction within a vertical surface (refer to arrow B). The second motor 37 is connected to the control unit 70 described below (refer to FIG. 5).

Figure 3:
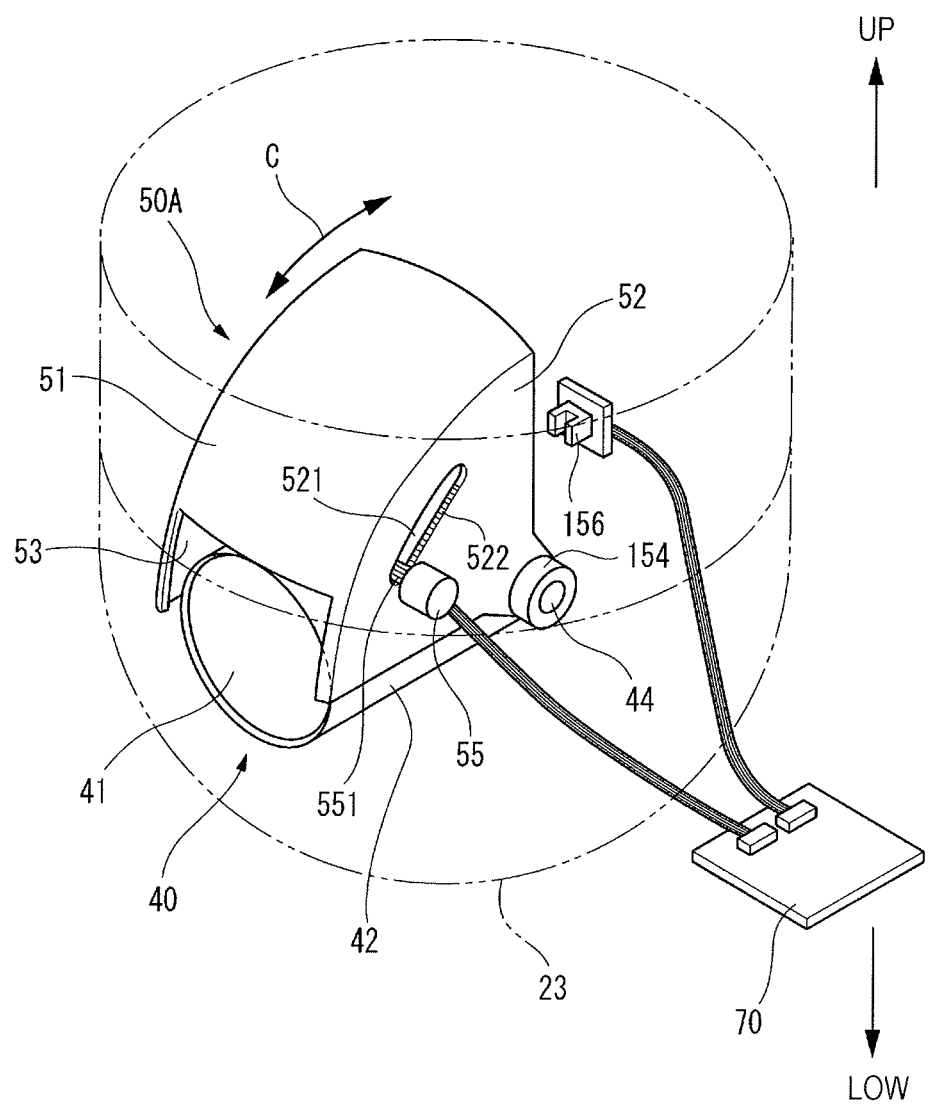
FIG. 3 is a camera unit seen from above.
Figure 4:
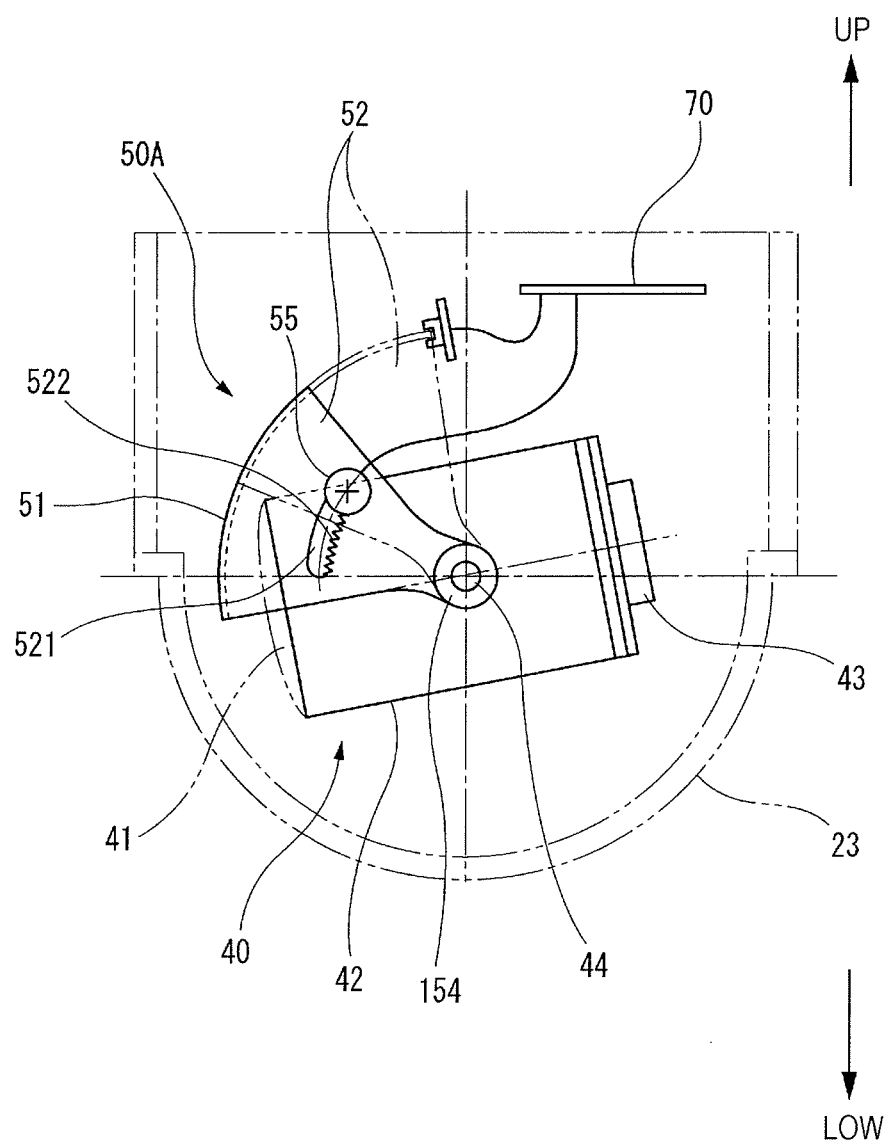
FIG. 4 is a side view of the camera unit and a shade plate portion.

As illustrated in FIGS. 3 and 4, the camera unit 40 has a barrel 42 which accommodates a lens 41, and an image pickup device 43 in which light passing through the barrel 42 is imaged to be converted into an electrical signal. On both of side surfaces of the barrel 42, a third rotating shaft 44 is provided protruding outward.

A third motor 55 is attached on an outside of the barrel 42 in a horizontal direction. The third motor 55 may be attached by any means as long as it can move integrally with the barrel 42. A gear 551 is mounted on a rotational shaft of the third motor 55. The third motor 55 is connected to the control unit 70 described below refer to FIG. 5).

A shade plate portion 50A is attached to a front surface (subject side) of the barrel 42. The shade plate portion 50A has a shade plate 51 which is bent in a partially arc shape. Both ends of the shade plate 51 in a width direction are supported by a facing pair of fan-shaped support plates 52 and 53. The support plates 52 and 53 have bearing portions 154 in a fan-shaped central position, and the bearing portions 154 are rotatably supported by the third rotating shaft 44.

An arc-shaped long hole 521 having the third rotating shaft 44 as the center is provided in the support plate 52 on one side. A gear 522 which meshes with the gear 551 of the third motor 55 is formed on a surface on a center side in the long hole 521.

Therefore, when the third motor 55 is rotated, the shade plate portion 50A rotates between a covered state where the shade plate 51 partially covers the front of the lens 41 of the camera unit 40 and a retreat state where the shade plate 51 is retreated from the front of the lens 41.

An origin sensor 156 is provided in rear of the shade plate portion 50A (opposite direction of subject). The origin sensor 156 can detect either the shade plate 51 of the shade plate portion 50A in the retreat state or the support plates 52 and 53.

The origin sensor 156 is connected to the control unit 70 and detect that the shade plate 51 is positioned in an origin point. Accordingly, the shade plate 51 can be accurately positioned, and thus, it is possible to control a shading rate at high accuracy.

Figure 5:
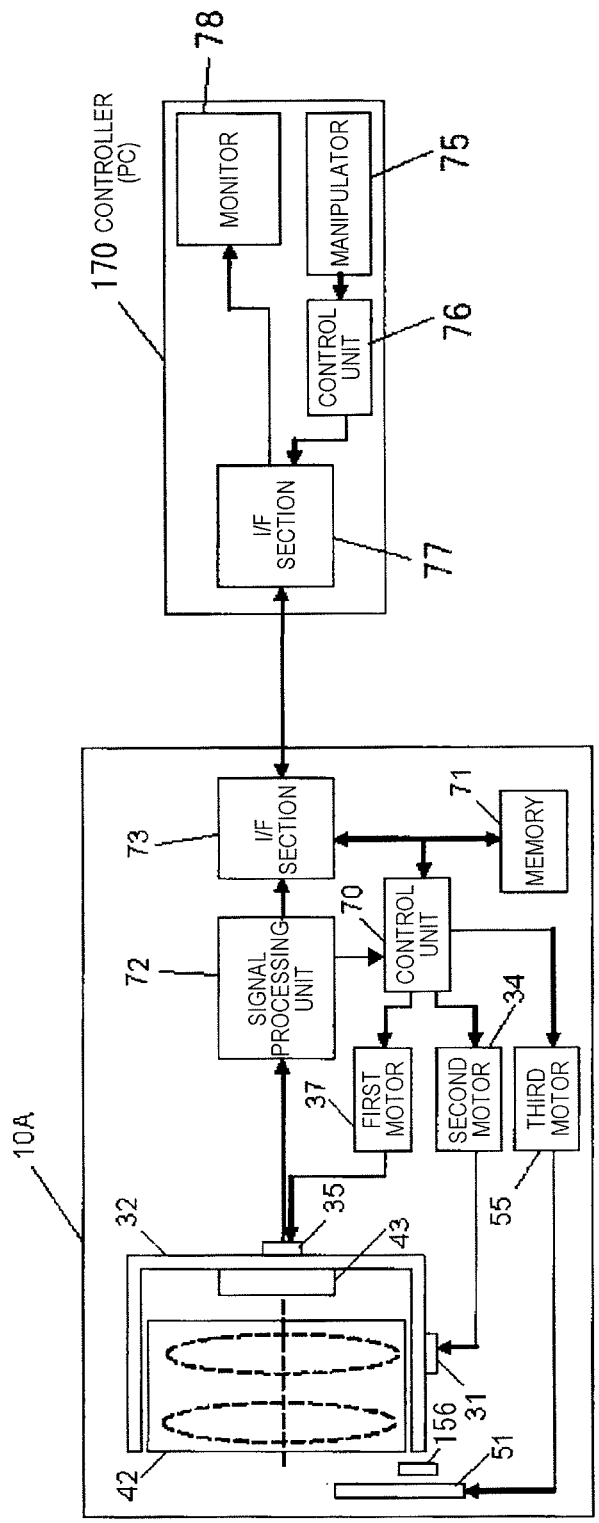
FIG. 5 is a block diagram illustrating a control system.

As illustrated in FIG. 5, the camera apparatus 10A has a signal processing unit 72 and an I/F section 73, in addition to the control unit 70 and a memory 71. The signal processing unit 72 performs video image signal processing such as a γ correction and a gain correction with respect to the signal from the image pickup device 43 and outputs the processed signal to the I/F section 73.

The I/F section 73 is connected to an external controller (PC) 170 through a network and transmits a video image signal from the signal processing unit 72 while transmitting a control signal from the controller (PC) 170 to the control unit 70.

Meanwhile, a manipulator 75, a control unit 76, an I/F section 77 and a monitor 78 are provided in the controller (PC) 170. The I/F section 77 is connected to the I/F section 73 of the camera apparatus 10A through the network and receives the video image signal from the camera apparatus 10A, thereby outputting to the monitor 78. The monitor 78 outputs the received video image signal to a screen through the I/F section 77.

In addition, the manipulator 75 inputs a signal to remotely control a position of the shade plate 51. The control unit 76 receives and analyzes the signal from the manipulator 75 and transmits a control signal for controlling the shade plate 51 to the camera apparatus 10A through the I/F section 77.

Accordingly, the controller (PC) 170 controls an angle in a pan direction and an angle in a tilt direction of the camera unit 40, thereby controlling a posture of the camera unit 40. In addition, the position of the shade plate 51 is controlled, thereby adjusting the shading rate.

The first motor 34, the second motor 37 and the third motor 55 are controlled by the control unit 70. Accordingly, the control unit 70 controls the rotating of the support member 32, the rotating of the camera unit 40 with respect to the support member 32, and a state of the shade plate portion 50A.

The memory 71 is connected to the control unit 70. As illustrated in FIG. 6, posture information on the camera unit 40 with respect to a preset number indicating a specific imaging direction, and information on the shade plate portion of the shade plate portion 50A are stored in the memory 71.

The above-described information is set, after the camera apparatus 10A is installed, through the controller (PC) 170 operated by a person away from the place.

In other words, the person causes the camera unit 40 to be oriented in the intended direction for imaging through the manipulator 75 of the controller (PC) 170, and controls and adjusts the position of the shade plate portion 50A so as to reduce the overlapping of the image and so as not to be too dark, as watching the video image captured by the camera unit 40 through the monitor 78. In this manner, after completing adjustment for the posture information indicating the imaging direction of the camera unit 40 and the information on the shade plate portion of the shade plate portion 50A, the person stores the posture information on the camera unit 40 indicating the imaging direction and the information on shade plate portion of the shade plate portion 50A together with the preset number to the memory 71 using a set button or the like in the manipulator 75 of the controller (PC) 170.

This process is performed from the preset number 1 to a preset number N, thereby creating a table illustrated in FIG. 6 to store the information in the memory 71.

As the posture information on the camera unit 40, for example, there are first angle information (pan angle) P about the first rotating shaft 31 of the support member 32 with respect to the body 20, second angle information (tilt information) T about the second rotating shaft 35 of the camera unit 40 with respect to the support member 36, zoom information Z, focus information F and the like.

In addition, as the information on the shade plate portion, for example, there is shading rate M by the shade plate 51, positional information of the shade plate 51 and the like.

Figure 7:
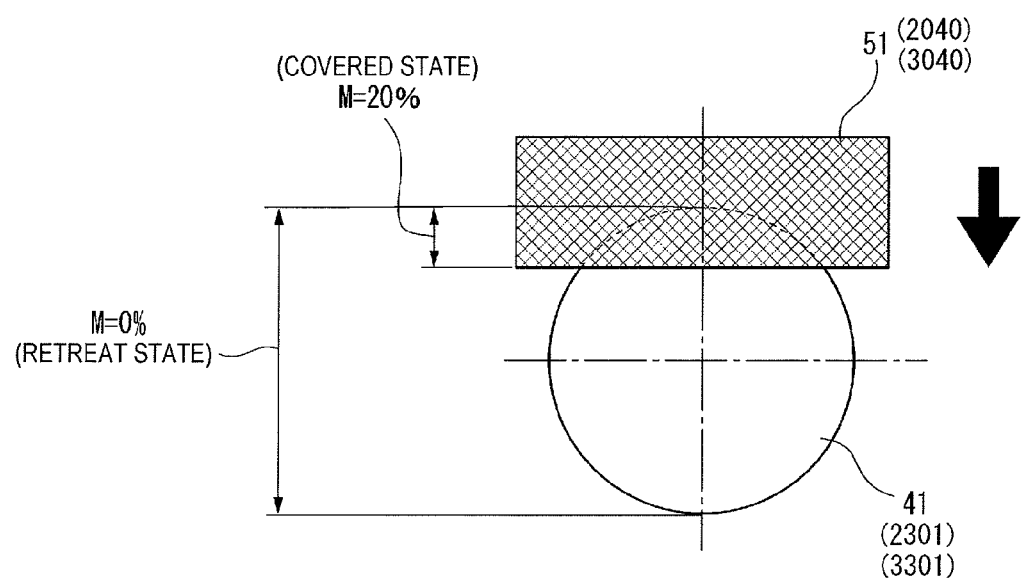
FIG. 7 is an explanatory view of a shading rate by a shade plate.

Here, as illustrated in FIG. 7, the shading rate M can be indicated in a rate (%) of an area of the lens 41 which is covered by the shade plate 51. Therefore, it is considered that the shading rate M=0 when the shade plate 51 is in the retreat state so that it is possible to obtain the brightness by 100%. This retreat state is easily detected at the high accuracy by the origin sensor 156 detecting the shade plate portion 50A.

Next, controlling of the camera apparatus 10A by the control unit 70 will be described.

Firstly, when the person selects the preset number 1 through the manipulator 75 of the controller (PC) 170, the control unit 70 performs imaging by causing the camera unit 40 to be oriented to a subject (front door, for example) of the preset number 1 which is stored in the memory 71, as illustrated in FIG. 6. In other words, the control unit 70 controls the first motor 34 to rotate the support member 32 in first angle (pan angle) P1 position. In addition, the control unit 70 controls the second motor 37 to rotate the camera unit 40 in second angle (tilt angle) T1 position. At the same time, zoom and focus control is performed for zoom position Z1 and focus position (focal portion) F1.

Moreover, the control unit 70 controls the third motor 55 to move the shade plate portion 50A. In FIG. 6, the shade plate portion 50A is set in the covered state so as to obtain the shading rate by 10%.

Next, when the person selects the preset number 2 through the manipulator 75 of the controller (PC) 170, the control unit 70 performs imaging by causing the camera unit 40 to be oriented to a subject (reception desk, for example) of the preset number 2 which is stored in the memory 71. In other words, the control unit 70 controls the first motor 34 to rotate the support member 32 in first angle (pan angle) P2 position. In addition, the control unit 70 controls the second motor 37 to rotate the camera unit 40 in second angle (tilt angle) T2 position. At the same time, zoom and focus control is performed for zoom position Z2 and focus position (focal portion) F2.

Moreover, the control unit 70 controls the third motor 55 to move the shade plate portion 50A. In FIG. 6, since the shading rate=0%, the shade plate portion 50A is moved to be in the retreat state.

Next, a captured image in the covered state where a portion of the front surface of the lens 41 is covered by the shade plate portion 50A will be described.

As illustrated in FIG. 8, when a magnification of the lens 41 is set in a telephoto, even if the upper end portion of the lens 41 is covered by the shade plate 51A, although there is a decrease in an overall amount of light, there is no damage to the image since the light from the subject reaches the image pickup device 43 through the lower end portion of the lens 41 which is not covered by the shade plate 51A.

Meanwhile, as illustrated in FIG. 9, when the magnification of the lens 41 is set in a wide-angle, if the upper end portion of the lens 41 is covered by the shade plate 51A, the light from an upper portion of the subject is blocked by the shade plate 51A without reaching the image pickup device 43, thereby resulting in occurrence of the damage to the image (indicated by dotted line in FIG. 9).

An operation effect of the camera apparatus 10A in the first embodiment will be described.

In the body 20 which is attached to the ceiling surface 11, the camera apparatus 10A has the support member 32 which is rotatable about the first rotating shaft 31 being perpendicular to the ceiling surface 11. The camera unit 40, which is rotatable about the second rotating shaft 35 being orthogonal to the first rotating shaft 31, is attached to the support member 32. The shade plate portion 50A is attached to the camera unit 40. In the shade plate portion 50A, it is possible to select the state between the covered state where the shade plate 51 partially covers the front of the lens 41 of the camera unit 40 and the retreat state where the shade plate 51 is retreated from the front of the lens 41.

Figure 10A:
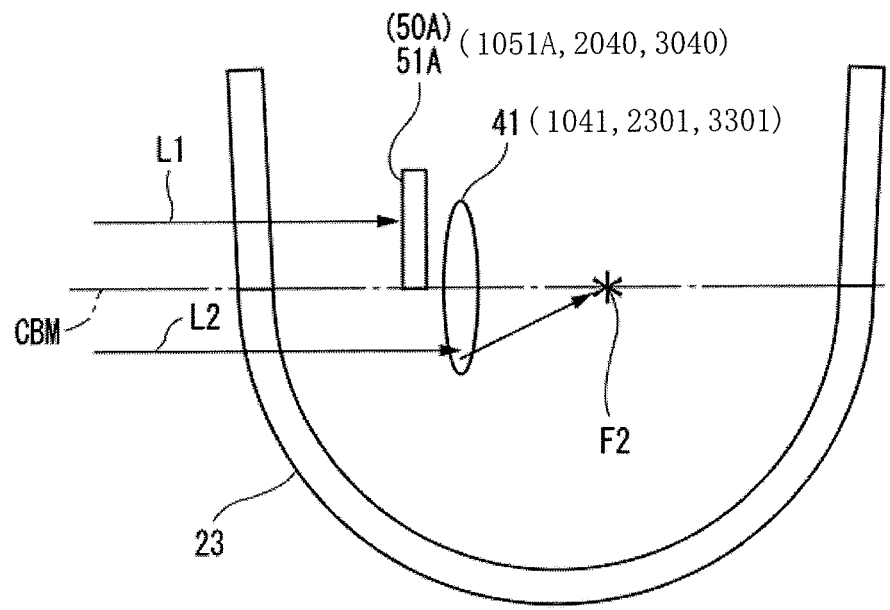
FIG. 10A is a schematic sectional view illustrating image-formation when light on an upper side of an optical axis is shaded
Figure 10B:
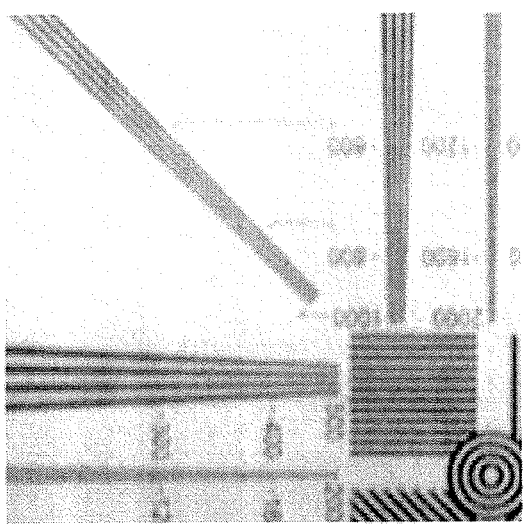
FIG. 10B is a photograph of an image which is formed through FIG. 10A.

In other words, as illustrated in FIG. 10A, it is possible to shade light L1 above optical axis CBM using the shade plate 51A. Accordingly, only light L2 below the optical axis CBM is incident on the lens 41, and thus, as illustrated in FIG. 10B, it is possible to shade one of the overlapping (out of focus) images and improve the image quality.

The camera apparatus 10A has the control unit 70 which controls the rotating of the support member 32 with respect to the body 20, the rotating of the camera unit 40 with respect to the support member 32, and the state the shade plate portion 50A. In addition, the camera apparatus 10A has the memory 71 which stores a plurality of pieces of posture information including an imaging direction of the camera unit 40. The memory 71 stores a plurality of pieces of posture information including first angle information (pan angle information) P which is information on a direction of the camera unit 40 having a first rotating shaft 31 as the center and second angle information (tilt angle information) T which is information on the direction of the camera unit 40 having a second rotating shaft 35 as the center with respect to the body 20. In addition, the memory 71 also stores information on the shade plate portion indicating a shading rate M in the retreat state or the covered state.

Then, the control unit 70 determines the direction of the camera unit 40 based on the posture information stored in the memory 71, and determines the shading rate M of the shade plate 51 based on the information on the shade plate portion stored in the memory 71.

Accordingly, it is possible to obtain the most suitable image and achieve improvement in the monitoring ability by adjusting the shading rate M.

(Second Embodiment)

Next, a camera apparatus according to a second embodiment will be described.

The same reference numerals and signs will be applied to the portions which are common to those of the camera apparatus 10A in the first embodiment, and the repeated description will be omitted.

Figure 11:
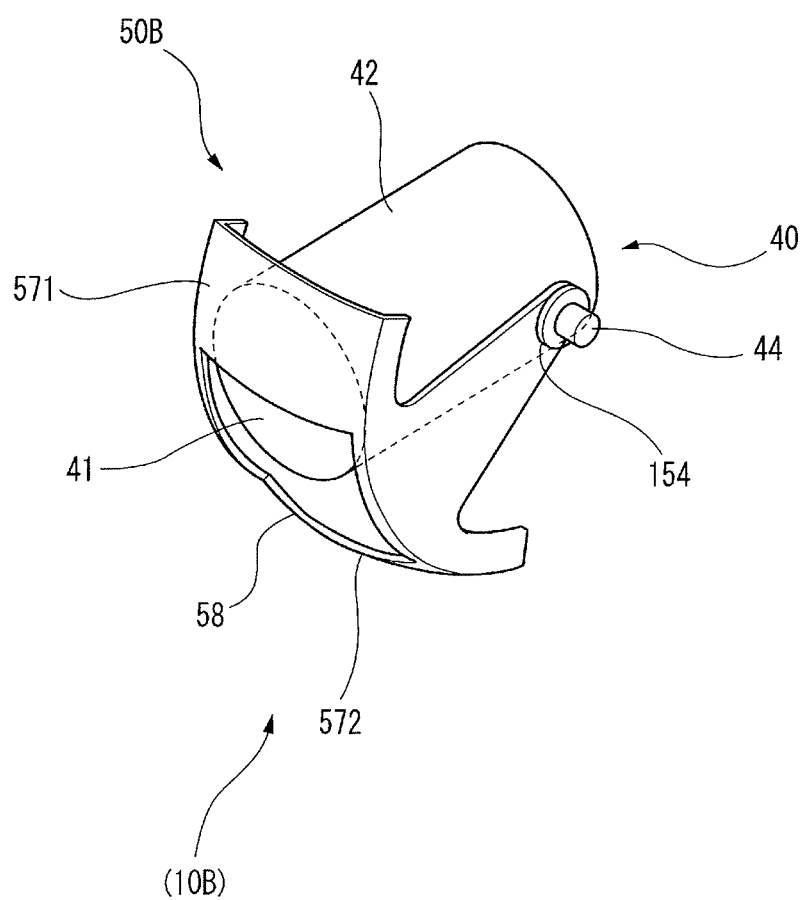
FIG. 11 is a perspective view of the shade plate portion of the camera apparatus according to a second embodiment of the present invention.

As illustrated in FIG. 11, in a camera apparatus 10B in the second embodiment, a shade plate portion 50B has a pair of (sub) shade plates 571 and 572, upper and lower. Both of the shade plates 571 and 572 are separate away from each other by distance larger than an outer diameter of the lens 41, and an opening 58 is provided between both of the shade plates 571 and 572.

Therefore, as illustrated in FIG. 12A, in a state of the shading rate M=0, overall of the front of the lens 41 is exposed forward front the opening 58.

Meanwhile, in a shaded state where the shade plate portion 50B is rotated downward (arrow A in FIG. 12B), an upper of the lens 41 is shaded by the shade plate 571.

Next, the shade plate portion 50B when the camera unit 40 is rotated by 180 degrees about the second rotating shaft 35 to be inverted will be described.

In FIG. 13A, the camera unit 40 is oriented in one direction of the horizontal direction and illustrating the covered state where an upper portion of the lens 41 is covered by a portion of the shade plate 571. The camera unit 40 and the shade plate portion 50B are rotated in the arrow A direction from this state.

FIG. 13B illustrates a state where the camera unit 40 is rotated by 90 degrees about the second rotating shaft 35 to be oriented directly below. When rotating the camera unit 40, the shade plate portion 50B is synchronized and rotated about the third rotating shaft 44. Here, when the camera unit 40 is oriented downward, the shade plate portion 50B side is rotated slightly fast so that the lens 41 is positioned in an opening 58 of the shade plate portion 50B. Accordingly, the front of the lens 41 is in the retreat state where the front of the lens 41 is not covered by both of the shade plates 571 and 572.

Then, as illustrated in FIG. 13C, when the camera unit 40 is further rotated in the A direction to be oriented in the other direction of the horizontal direction, the shade plate portion 50B is in the covered state where the other shade plate 572 covers the upper portion of the lens 41.

In this case, since a vertical direction of the lens 41 is inverted, the signal processing unit 72 performs a vertical inversion of the video image.

In FIGS. 13A to 13C, although the second rotating shaft 35 and the third rotating shaft 44 are provided in the same position, the similar state is applied to a case of being provided in different positions.

Hereinbefore, according to the camera apparatus 10B in the second embodiment, the shade plate portion 50B has the pair of (sub) shade plates 571 and 572 which are separate in a movement direction of the shade plate portion 50B away from each other by distance larger than an outer diameter of the lens 41 of the camera unit 40.

For this reason, even if the camera unit 40 and the shade plate portion 50B are inverted about the second rotating shaft 35, it is possible to adjust the shading rate M.

(Third Embodiment)

Next, a camera apparatus according to a third embodiment will be described.

In the camera apparatuses 10A and 10B in the first embodiment and the second embodiment, the shade plate portions 50A and 50B are moved to partially block light of the lens 41 to prevent the images from overlapping, thereby obtaining the most suitable images.

In a camera apparatus 10C in the third embodiment, a function to protect privacy is realized using the structure of the shade plate portions 50A and 50B.

Figure 14:
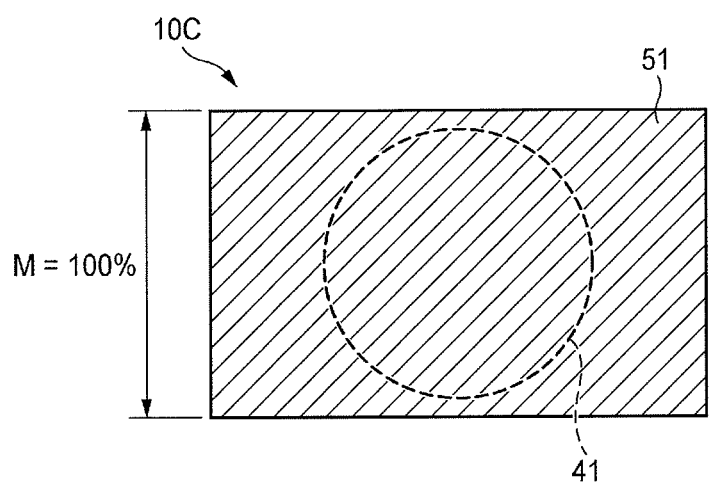
FIG. 14 is a front view illustrating a position of the shade plate portion in a privacy mode.

As illustrated in FIG. 14, the camera apparatus 10C in the third embodiment, the third motor 55 is controlled (refer to FIGS. 3 to 5) to move the shade plate 51 to cover an overall front sphere of the lens 41 to be hidden. In this manner, when the shade plate 51 is in the position to cover the overall front sphere of the lens 41 to be hidden (shading rate M=100%), it is possible to protect privacy for a subject person to be imaged projected on the camera unit 40 and appear that the subject person to be imaged is not captured.

Figure 15:
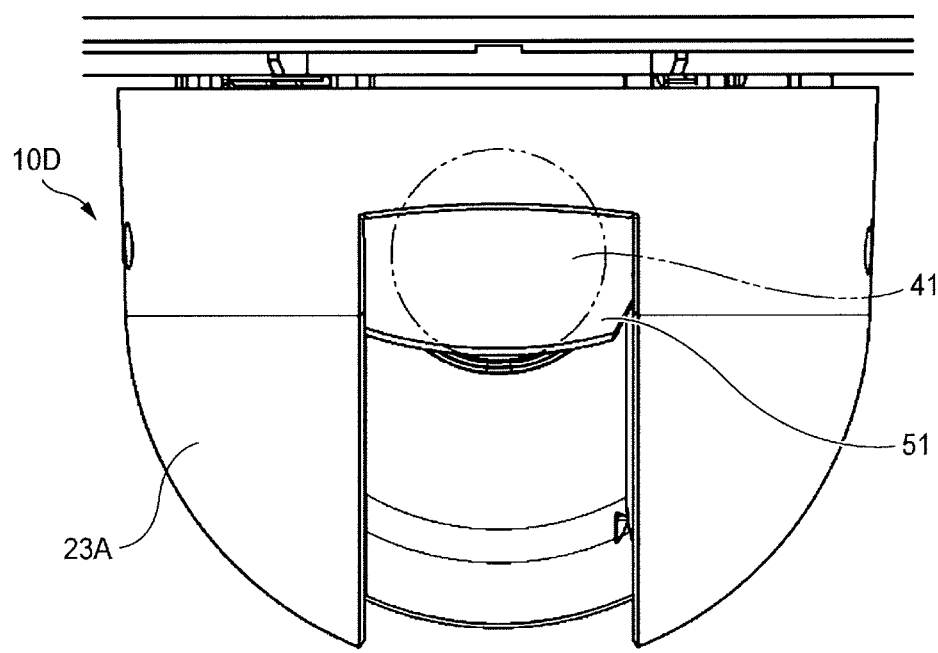
FIG. 15 is a front view of the camera unit and the shade plate portion in the privacy mode.
Figure 16:
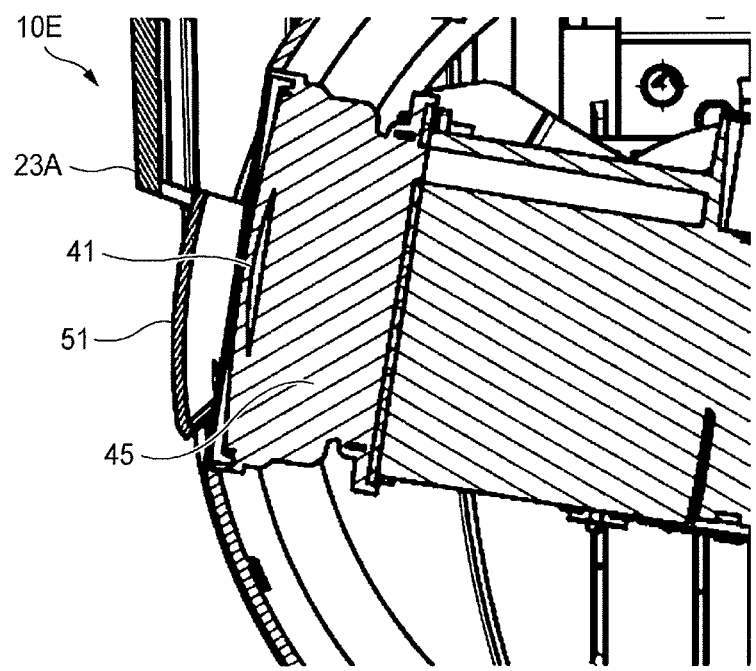
FIG. 16 is a cross-sectional view of the camera apparatus in the privacy mode.

In addition, the present invention includes not only the structure in which the shade plate 51 covers the overall front sphere of the lens 41 by the shade plate 51 but also a structure in which the lens 41 is covered to be hidden using an inner cover 23A which is provided between a cover 23 (refer to FIG. 2) as a camera apparatus 10D illustrated in FIG. 15, and the lens 41 (refer to FIG. 2) or a structure in which the lens 41 is covered to be hidden using a camera casing 45 as a camera apparatus 10E illustrated in FIG. 16.

In these cases, it is necessary to adjust not only the shade plate 51 but also the directions of the camera apparatuses 10D and 10E to be coordinated with the inner cover 23A or the camera casing 45.

Moreover, if the posture information and the information on the shade plate portion (shading rate=100%) are registered in the memory 71 of the camera apparatuses 10A, 10B, 10C, 10C and 10E together with the preset number, it is possible to realize the function to protect the privacy in a specific position. In other words, it is possible for the person to switch over to the privacy mode in which the privacy is automatically prioritized by inputting the preset number through the manipulator 75 of the controller (PC) 170.

In this manner, since the controlling of the shade plate 51 can be realized as well as the function of protecting the privacy, there is no need for the camera apparatuses 10A, 10B, 10C, 10C and 10E, and a controller (PC) 170 to be provided with an ON/OFF command in the privacy function, thereby requiring no update for the controller (PC) 170.

In addition, the shade plate may be automatically disposed in front of the lens 41 in accordance with the direction of the camera.

(Fourth Embodiment)

Next, a camera apparatus according to a fourth embodiment will be described.

In the camera apparatuses 10A and 10B in the first embodiment and the second embodiment, a range for adjusting positions of the shade plates 51, 571 and 572 to shade (position of shade plate) is stored in advance in accordance with the posture information of the camera unit 40.

However, it takes time and labor for manually setting the position of the shade plate while watching the video image, thereby causing a disadvantage for a user to feel as a burden.

The present embodiment provides a camera apparatus in which the position of the shade plate can be automatically set.

Figure 35:
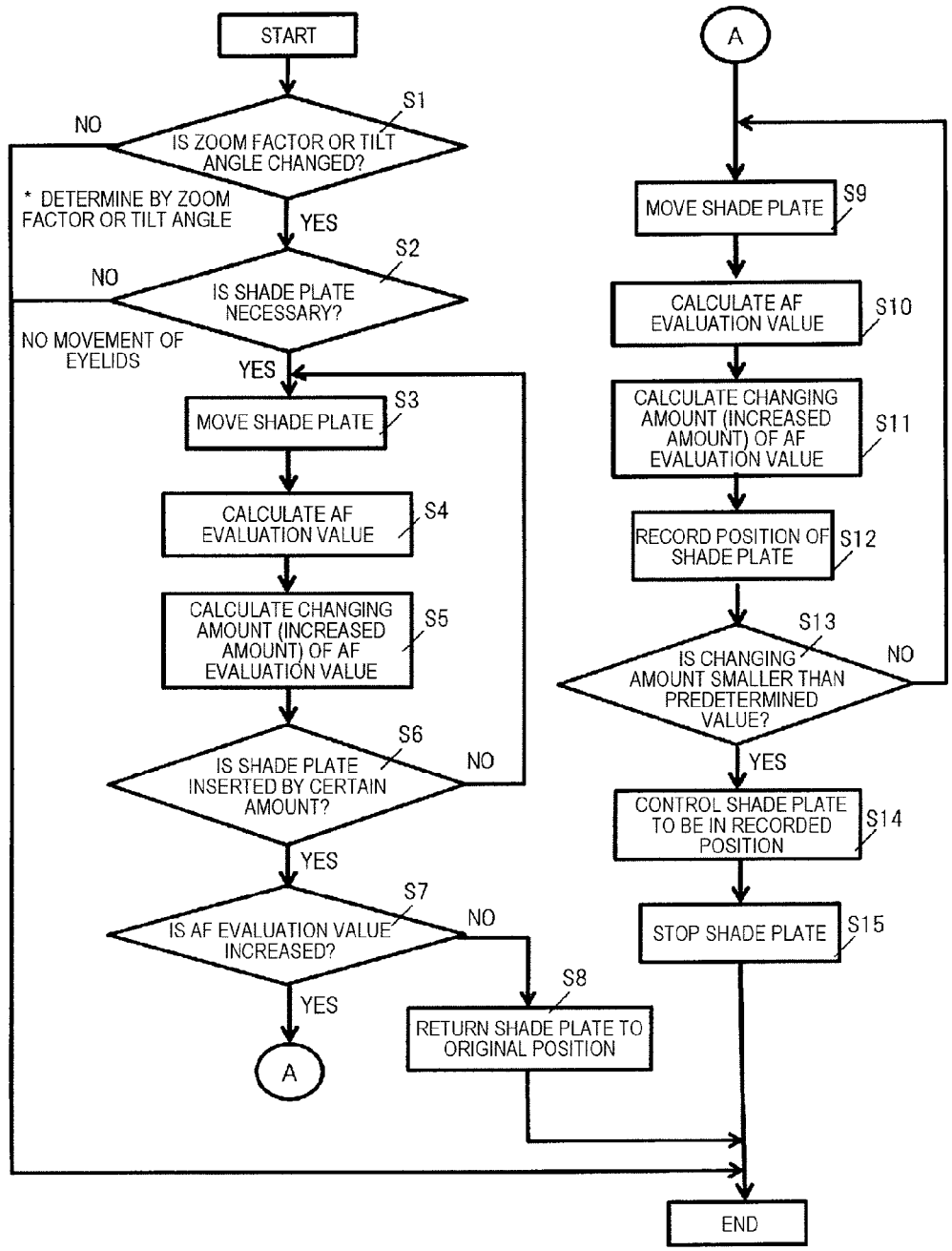
FIG. 35 is a flow chart explaining an operation of the camera apparatus according to a fourth embodiment of the present invention.

Hereinafter, a method of controlling the shade plate in the control unit 70 of a camera apparatus according to the fourth embodiment will be described using the flowchart in FIG. 35. The description below prefers the state where the shade plate is retreated, that is, the state where shading rate M of the information on the shade plate portion illustrated in FIG. 6 is 0% (refer to FIG. 3).

Firstly, for example, when a zoom factor or the tilt angle are changed by an artificial operation (YES in S1), the control unit 70 decides whether or not the shade plate is to be inserted (S2). For example, when the zoom factor is ×1 of the wide-angle, or the tilt angle is changed to be oriented directly below, the control unit 70 determines that there is no need for the shade plate to be inserted (NO in S2), thereby ending the operation illustrated in FIG. 35. The zoom factor and the range of the tilt angle in which the insertion of the shade plate is not necessary are set in the memory 71 in advance.

When it is decided that the shade plate is inserted (YES in S2), as moving the shade plate (S3), image data related to a region (for example, AF area as central area) of a portion of the image data is acquired, and extract a high frequency component from the image data, thereby calculating a value evaluating a focusing state of the subject (hereinafter, AF evaluation value) through summation of the extracted high frequency components (S4). Since the method of calculating the AF evaluation value in the control unit 70 in Step S4 is a known technology, the description thereof will be omitted.

As the shade plate is gradually inserted, the control unit 70 calculates a change in the AF evaluation value (S5). When the focal point is deviated due to only influence of the subject, the AF evaluation value seldom increases even if the shade plate is inserted. Therefore, the control unit 70 moves the shade plate to a certain amount (S6), and if the AF evaluation value from start in the flow chart illustrated in FIG. 35 until the shade plate moves to a certain amount in the Step S6 does not monotonically increase (NO in S7), the shade plate is returned to the original position without being inserted (S8).

Figure 36A:
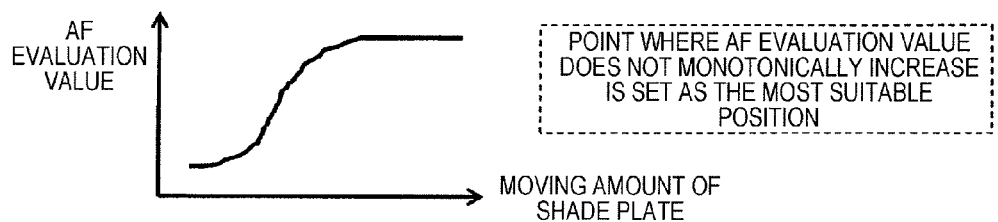
FIGS. 36A and 36B illustrate graphs of examples of a relationship between a moving amount of the shade plate and an AF evaluation value.

Meanwhile, when the focal point is deviated due to the influence of the dome cover, the AF evaluation value increases in the control unit 70 if the shade plate is inserted. When the AF evaluation value increases (YES in S7), the control unit 70 calculates a changing amount of the increased AF evaluation value with respect to the position of the shade plate as moving the shade plate (S9, S10, S11), and stores the position of the shade plate (S12) when the changing amount becomes smaller than a predetermined value (inclination is close to horizontal level) (S13). Then, the control unit 70 controls the shade plate to be in the stored position (S14, S15), and thus, it is possible to reduce the deterioration of the image quality due to the overlapped-image and improve the image quality. If the inserting amount of the shade plate increases, an incident amount of the light to the image pickup device decreases and an upper side of the screen close to the shade plate becomes slightly dimmed. Therefore, as illustrated in FIG. 36A, the position when the changing amount of the AF evaluation value becomes small is the most suitable position.

In this manner, the control unit 70 can automatically adjust the shade plate to the most suitable position by causing the position of the shade plate to be controlled, and thus, it is possible to project a sharp image in focus.

Figure 36B:
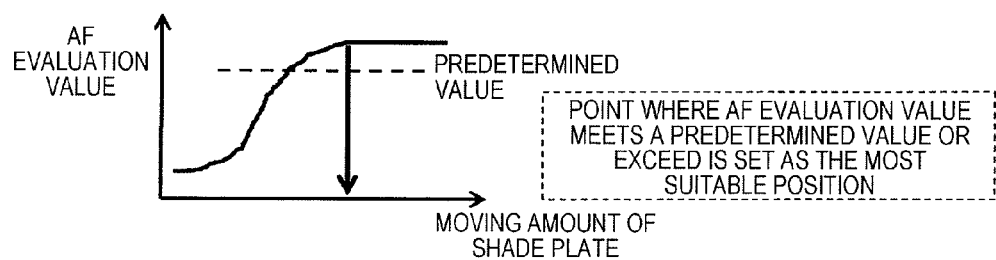

In addition, as a method of deciding the insertion position of the shade plate, instead of determining by the change in the AF evaluation value as described above, the control unit 70 may determine a position in which the AF evaluation value is more than a predetermined value to be the most suitable position as illustrated in FIG. 36B.

Figure 36C:
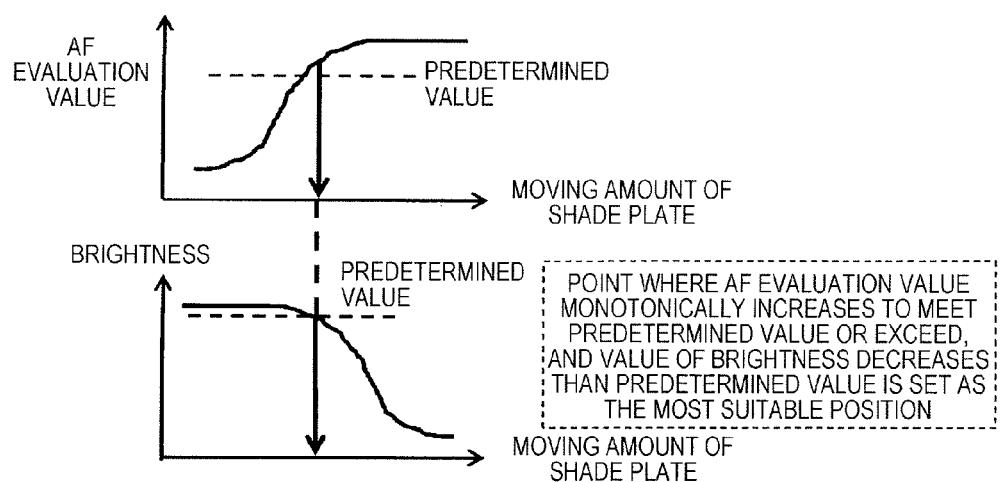
FIG. 36C illustrates graphs of each example of the relationship between the moving amount of the shade plate and the AF evaluation value and a relationship between the moving amount and brightness of the shade plate.

Moreover, although the deterioration of the image quality due to the overlapped-image can be reduced by inserting the shade plate, the brightness also is degraded. Therefore, the control unit 70 may also be caused to calculate a value of the brightness (level of luminance signal, for example) together with the AF evaluation value which changes in response to the inserting amount of the shade plate, thereby storing the position of the shade plate when the AF evaluation value increases, and exceeds a predetermined value, and the value of the brightness is reduced than a predetermined value as illustrated in FIG. 36C.

In the present embodiment, although the state of the retreated shade plate is preferred in the description, even if the shade plate is already inserted, it is possible to move the shade plate to the most suitable position, if the control unit 70 once moves the shade plate to the retreat position and performs the same processing when the zoom factor or the tilt angle are changed so as to be determined that the shade plate is necessary. The control unit 70 may decide the shading rate M of the information on the shade plate portion illustrated in FIG. 6 to store in the memory 71 by adopting the method of deciding the most suitable position of the shade plate according to the embodiment.

The camera apparatus and the method of controlling a camera apparatus according to the present invention is not limited to each of the embodiments described above, thereby being possible to be appropriately changed, modified and the like.

For example, in each of the embodiments described above, a case where the hemispherical cover 23 is included is exemplified. However, in addition to this, a case of a semi-elliptical cover or a cylindrical cover to be included can also be applied.

(Fifth Embodiment)

In the related art, in camera apparatuses such as a monitoring camera, it is generally accepted that a camera lens is rotated in a pan direction and a tilt direction for imaging (for example, refer to JP-A-2012-103452).

Figure 17:
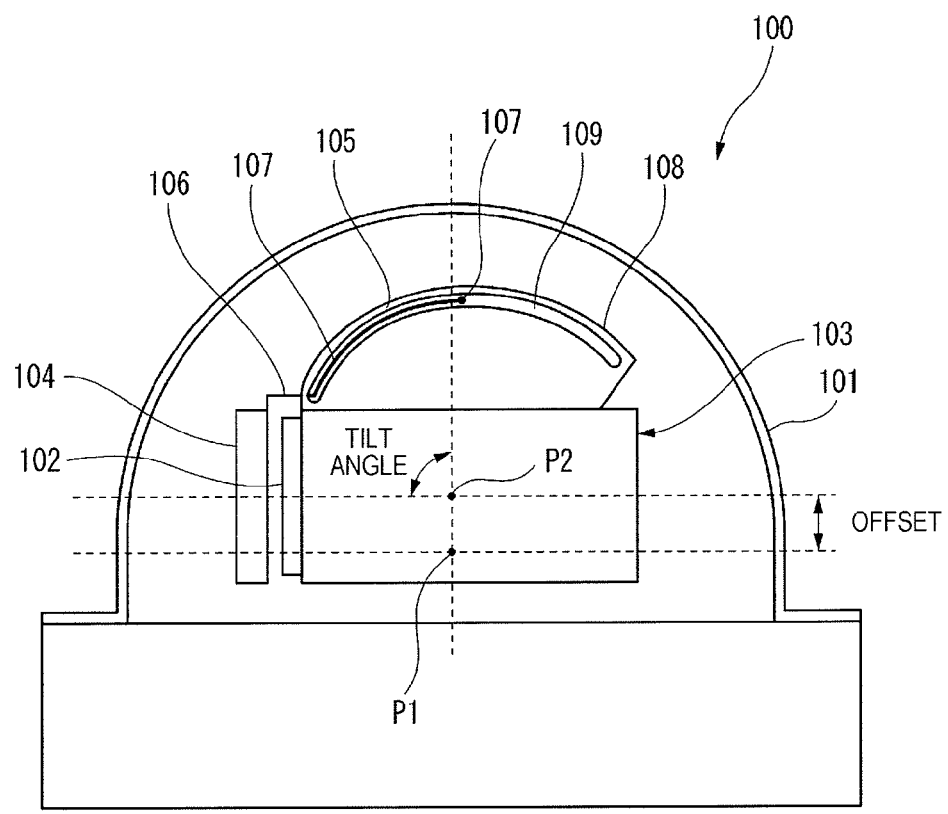
FIG. 17 is a schematic configuration of an optical system of a CCD camera which is mounted on a vehicle in the related art.

As illustrated in FIG. 17, a dome-type camera 100 disclosed in JP-A-2012-103452 includes a hemispherical dome cover 101. Inside the dome cover 101, a lens unit 103 having a camera lens 102 is accommodated.

In the dome-type camera 100, there are provided a pan motor and a tilt motor. The lens unit 103 is rotatable in the pan direction and the tilt direction.

A partial shade filter 104 is included in the lens unit 103. An arc-shaped guide portion 105 is provided in an end portion of the partial shade filter 104 through a support piece 106. Two guide pins 107 are respectively provided on each of side surfaces of the guide portion 105 on the right and left. A pair of guide plates 108 are provided in an upper portion of the lens unit 103 on the right and left. The guide pin 107 of the guide portion 105 is inserted into an arc-shaped long hole 109 which is provided in the guide plate 108 in a slidable manner.

Accordingly, the partial shade filter 104 reciprocates between an insertion position and a retreat position.

Figure 18A:
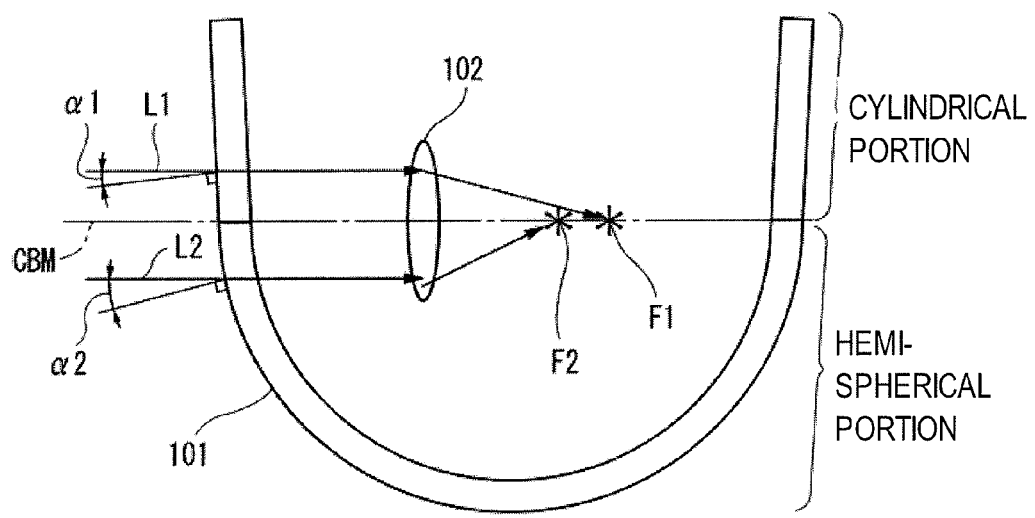
FIG. 18A is an explanatory view when the images are overlapped due to a difference of penetration angles of lights penetrating a cover on an upper side and a lower side of the optical axis.
Figure 18B:
FIG. 18B is a photograph in which the images are projected in an overlapping manner in a case of FIG. 18A.

Incidentally, as illustrated in FIG. 18A, the dome cover 101 is provided with a cylinder portion on the upper side of the hemisphere portion for the connection with the accommodation portion. Therefore, when the lens unit 103 is at an angle close to the horizontal level, penetration angle α1 of light L1 penetrating the dome cover 101 on an upper side of an optical axis CBM and penetration angle α2 of light L2 penetrating the dome cover 101 on a lower side thereof are different from each other. Accordingly, positions of focal points F1 and F2 deviate from each other resulting in a disadvantage of deterioration of the image quality due to the overlapping causing the blurred images as illustrated in FIG. 18B, for example.

Figure 26:
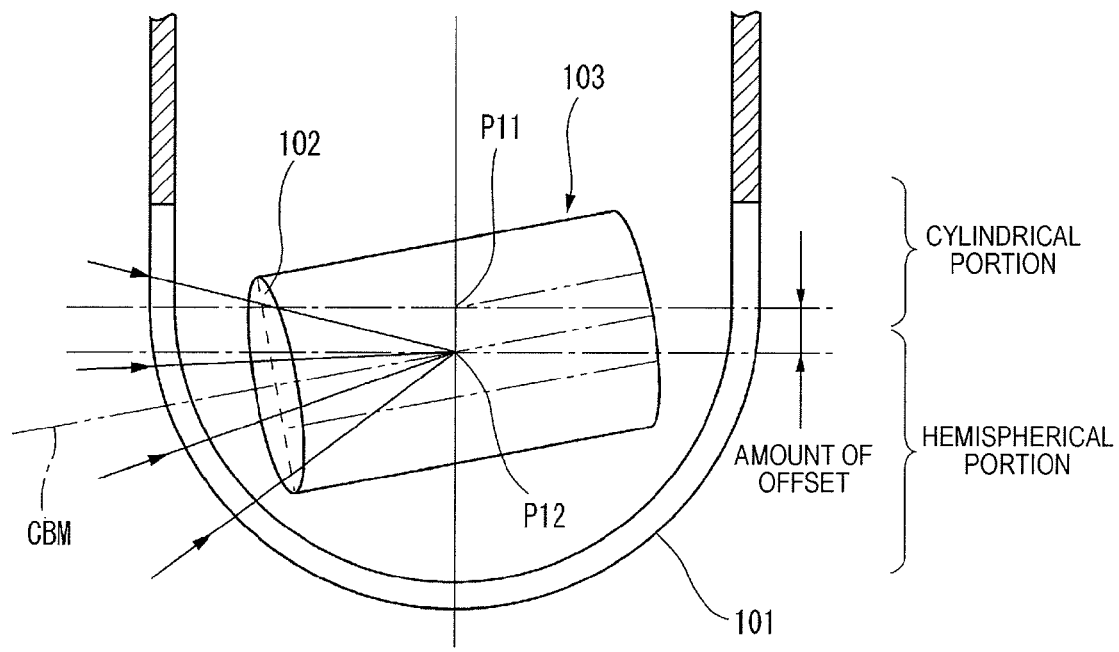
FIG. 26 is a cross-sectional view illustrating light penetrating a hemispherical cover of the camera apparatus in the related art.

The disadvantage also occurs in light penetrating the hemisphere portion due to the different penetration angles, when a center P11 of the hemispherical dome cover 101 and a rotating center P12 of the lens unit 103 are disposed to be deviated (offset) as illustrated in FIG. 26.

A non-limited object is to provide a camera apparatus that can reduce the overlapping of the image and improve the image quality, and a method of controlling a camera apparatus.

Hereinafter, a camera apparatus and a method of controlling a camera apparatus according to a fifth embodiment of the present invention will be described with reference to the drawings.

Similar to the camera apparatus 10A as illustrated in FIG. 1, a camera apparatus 10F in the fifth embodiment is, for example, attached to a ceiling surface 11 which is an attachment surface and can be used as a monitoring camera which can monitor lower regions by 360 degrees from the ceiling surface 11.

In the description below, it is considered that the ceiling surface 11 is an upper side and the opposite side of the ceiling surface 11 is the lower region.

The camera apparatus 10F has a body 1020 which can be attached to the ceiling surface 11. The body 1020 has a disk-shaped base 1021 which is attached to the ceiling surface 11, an approximately cylindrical accommodation portion 1022 which is attached to a lower side of the base 1021, and a transparent hemispherical cover 1023 and covers an opening 1221 of the accommodation portion 1022. A camera unit 1040 is accommodated inside the cover 1023.

Figure 19:
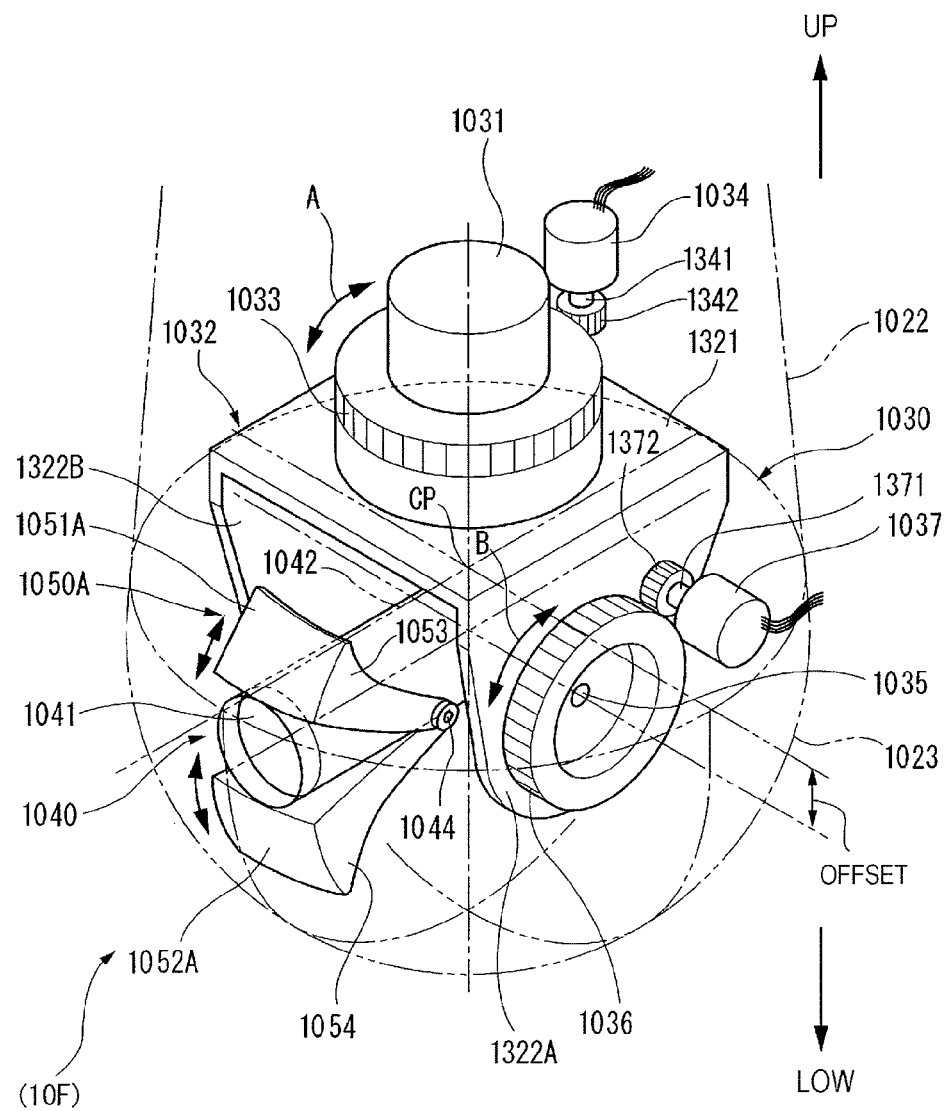
FIG. 19 is a perspective view of a mechanism which is accommodated in the body of the camera apparatus seen from above according to a fifth embodiment of the present invention.

As illustrated in FIG. 19, an inner mechanism 1030 is accommodated in the body 1020. The inner mechanism 1030 accommodated in the accommodation portion 1022 of the body 1020 has a first rotating shaft 1031 which is accommodated in the accommodation portion 1022 and is perpendicular to the ceiling surface 11.

A support member 1032, which is rotatable in an arrow A direction with respect to the body 1020 about the first rotating shaft 1031, is attached to a lower end portion of the first rotating shaft 1031. An upper end portion of the first rotating shaft 1031 is fixed to an upper portion of the base 1021 or the accommodation portion 1022.

The support member 1032 exhibits an angular U-shape in its entirety and has a top plate 1321 and a facing pair of side plates 1322A and 1322B which extend downward from the top plate 1321. A gear portion 1033 having larger diameter than the first rotating shaft 1031 is provided around the first rotating shaft 1031 on an upper side of the top plate 1321 so as to rotate integrally with the support member 1032.

A first motor 1034 is attached to the accommodation portion 1022 of the body 1020. A gear 1342 which meshes with the gear portion 1033 is attached to a rotational shaft 1341 of the first motor 1034.

Therefore, the gear portion 1033 is controlled in rotation by the first motor 1034, and the support member 1032 is controlled in the rotating in the arrow A direction of FIG. 19.

A second rotating shaft 1035 which is orthogonal to the first rotating shaft 1031 is provided to be rotatable with respect to the support member 1032 in each of the pair of side plates 1322A and 1322B of the support member 1032. A camera unit 1040 is integrally provided between a pair of the second rotating shafts 1035.

Therefore, the camera unit 1040 is integrally rotatable with the pair of the second rotating shafts 1035 with respect to the side plates 1322A and 1322B.

The second rotating shaft 1035 is provided horizontally in a position deviated (offset) from a center CP of the cover 1023. A gear portion 1036 is included in a tip of one of the second rotating shafts 1035. The gear portion 1036 rotates integrally with the second rotating shaft 1035.

A second motor 1037 is attached to the support member 1032. A gear 1372 which meshes with the gear portion 1036 is attached to a rotational shaft 1371 of the second motor 1037. The gear portion 1036 is controlled by the second motor 1037, and the camera unit 1040 is controlled in rotating in a vertical direction within a vertical surface (refer to arrow B).

Figure 20:
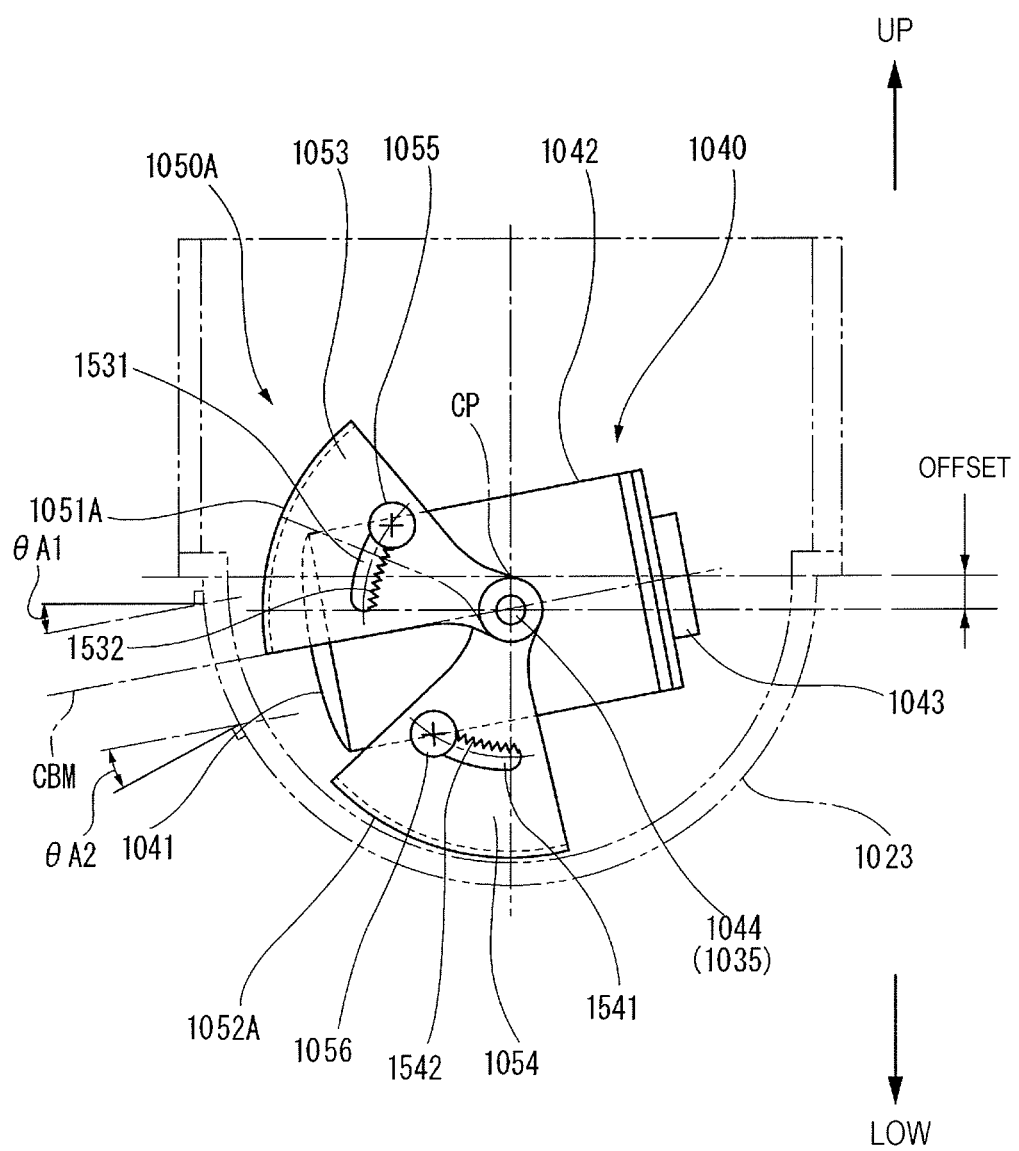
FIG. 20 is another side view of the camera unit and the shade plate portion.

As illustrated in FIGS. 19 and 20, the camera unit 1040 has a barrel 1042 which accommodates a lens 1041, and an image pickup device 1043 in which light passing through the barrel 1042 is imaged to be converted into an electrical signal. On both of side surfaces of the barrel 1042, a third rotating shaft 1044 is provided protruding outward.

A pair of third motors (shade plate drive units) 1055 and 1056 are attached on an outside of the barrel 1042 in a horizontal direction. A gear (not illustrated) is mounted on a rotational shaft of the third motor 1055.

A shade plate portion 1050A is attached to a front surface (subject side) of the barrel 1042. The shade plate portion 1050A has shade plates 1051A and 1052A which are bent in partially arc shapes. Both ends of the shade plates 1051A and 1052A in a width direction are supported by a facing pair of fan-shaped support plates 1053 and 1054. A fan-shaped central position of the support plates 1053 and 1054 are rotatably supported by the third rotating shaft 1044.

As illustrated in FIG. 20, arc-shaped long holes 1531 and 1541 having the third rotating shaft 1044 as the center is provided in one of the support plates 1053 and 1054. Gears 1532 and 1542 which mesh with the gears attached to the third motors 1055 and 1056 are formed on a surface on a center side in the long holes 1531 and 1541.

Therefore, when the third motor 1055 is rotated, the shade plate 1051A rotates between a covered state (state illustrated in FIG. 20) where the front of the lens 1041 of the camera unit 1040 is partially covered and a retreat state being retreated from the front of the lens 1041.

Similarly, when the third motor 1056 is rotated, the shade plate 1052A rotates between the covered state where the front of the lens 1041 of the camera unit 1040 is partially covered and the retreat state (state illustrated in FIG. 20) being retreated from the front of the lens 1041.

The camera unit 1040 and the shade plate portion 1050A are covered by the cover 1023 having transparency which is attached to the body 1020.

Here, as illustrated in FIG. 20, in accordance with rotating about the second rotating shaft 1035 of the camera unit 1040, the cover 1023 is in a shape in which a penetration angle θA1 in the upper side having the optical axis CBM of the camera unit 1040 as the center and a penetration angle θA2 in the lower side (the other side) are different from each other. Here, for example, it is possible to make the cover 1023 in a hemispherical shape.

Next, movements of the shade plates 1051A and 1052A will be described.

Figure 21A:
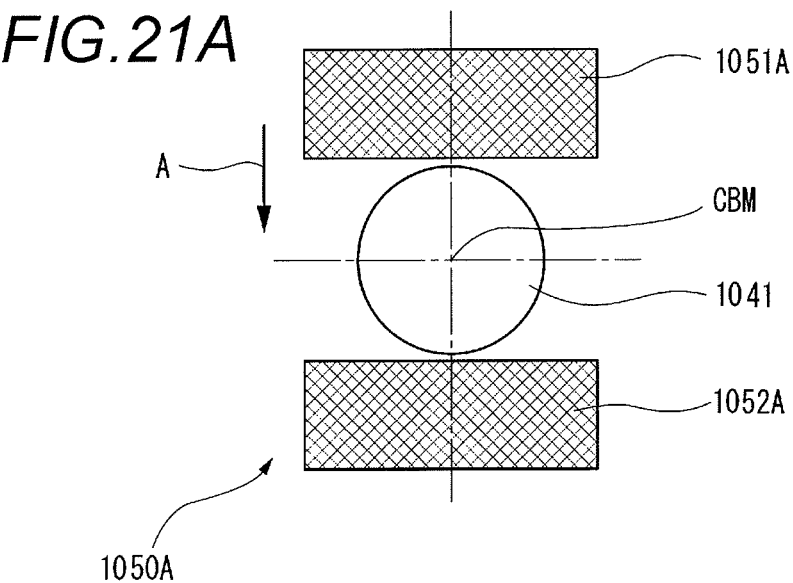
FIG. 21A is a front view illustrating the shade plate in the retreat state of the camera apparatus according to a fifth embodiment of the present invention.

As illustrated in FIG. 21A, in the retreat state, the shade plate 1051A is positioned on the upper side of the lens 1041, and the shade plate 1052A is positioned on the lower side of the lens 1041. In this state, neither of the shade plates 1051A nor 1052A covers the front of the lens 1041.

When shifting to the covered state, the shade plate 1051A or the shade plate 1052A is caused to approach the optical axis CBM. In the description below, a case where the shade plate 1051A is lowered (refer to arrow A in FIG. 21A) will be described.

Figure 21B:
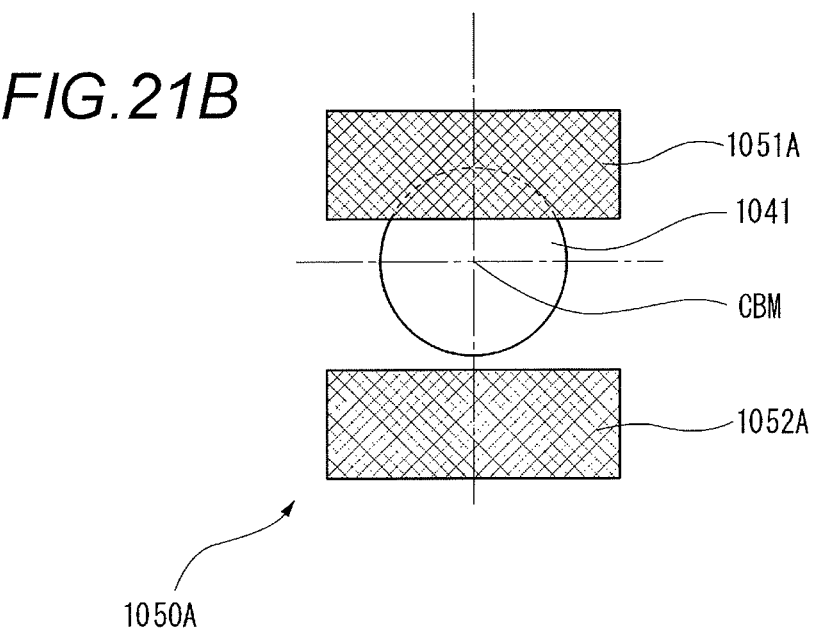
FIG. 21B is a front view illustrating the shade plate in the covered state.

In this manner, as illustrated in FIG. 21B, the shade plate 1051A covers the upper side which is one side of the optical axis CBM of the lens 1041, thereby being in the covered state.

It is also possible to be in the covered state by covering the lower side which is the other side of the optical axis CBM of the lens 1041 using the shade plate 1051B.

Next, a captured image in the covered state where a portion of the front surface of the lens 1041 is covered by the shade plate portion 1050A will be described.

As illustrated in FIG. 8, when a magnification of the lens 1041 is set in a telephoto, even if the upper end portion of the lens 1041 is covered by the shade plate 1051A, although there is a decrease in an overall amount of light, there is no damage to the image since the light from the subject reaches the image pickup device 1043 through the lower end portion of the lens 1041 which is not covered by the shade plate 1051A.

Meanwhile, as illustrated in FIG. 9, when the magnification of the lens 1041 is set in a wide-angle, if the upper end portion of the lens 1041 is covered by the shade plate 1051A, the light from an upper portion of the subject is blocked by the shade plate 1051A without reaching the image pickup device 1043, thereby resulting in occurrence of the damage to the image (indicated by dotted line in FIG. 9).

An operation effect of the camera apparatus 10F according to the fifth embodiment will be described.

In the body 1020 which is attached to the ceiling surface 11, the camera apparatus 10F has the support member 1032 which is rotatable about the first rotating shaft 1031 being perpendicular to the ceiling surface 11. The camera unit 1040, which is rotatable about the second rotating shaft 1035 being orthogonal to the first rotating shaft 1031, is attached to the support member 1032. The shade plate portion 1050A is attached to the camera unit 1040. In the shade plate portion 1050A, it is possible to select the state between the covered state where the shade plates 1051A and 1052A partially cover the front of the lens 1041 of the camera unit 1040 and the retreat state where the shade plates 1051A and 1052A are retreated from the front of the lens 1041.

The camera unit 1040 and the shade plate portion 1050A are covered by the cover 1023 having transparency.

Here, in accordance with rotating about the second rotating shaft 1035 of the camera unit 1040, the cover 1023 is in a shape in which the penetration angles θA1 and θA2 in the upper and lower sides having the optical axis CBM of the camera unit 1040 as the center are different from each other. Here, for example, the cover 1023 has the hemispherical shape.

For this reason, rays of the light incident on the lens 1041 (102) penetrating the cover 1023 (101), such as the light L1 penetrating the upper side and the light L2 penetrating the lower side having the optical axis CBM of the camera unit 1040 as the center, are deviated from each other in the focal positions F1 and F2, and thus, the images are overlapped and the image quality is deteriorated.

Here, in the shade plate portion 1050A, there are provided a pair of shade plates 1051A and 1052A individually rotatable about the third rotating shaft 1044 which is parallel to the second rotating shaft 1035, and the third motors 1055 and 1056 which rotate the pair of shade plates 1051A and 1052A about the third rotating shaft 1044.

Therefore, the third motors 1055 and 1056 appropriately move the pair of shade plates 1051A and 1052A, and thus, it is possible that the pair of the shade plates 1051A and 1052A respectively block each of the upper side of the lower side having the optical axis CBM of the camera unit 1040 as the center.

In other words, as illustrated in FIG. 10A, it is possible to block the light L1 on the upper side of the optical axis CBM using the shade plate 1051A.

Accordingly, since only the light L2 on the lower side of the optical axis CBM is incident on the lens 1041, as illustrated in FIG. 10B, one of the overlapping images can be blocked, and thus, it is possible to improve the image quality.

It is also possible to obtain the similar operation and the effect by blocking the light L2 on the lower side of the optical axis CBM using the shade plate 1052A.

(Sixth Embodiment)

Next, a camera apparatus and a method of controlling a camera apparatus according to a six embodiment of the present invention will be described.

The same reference numerals and signs are applied to the portions common with the camera apparatus 10F according to the fifth embodiment described above, thereby omitting the repeated description.

Figure 22A:
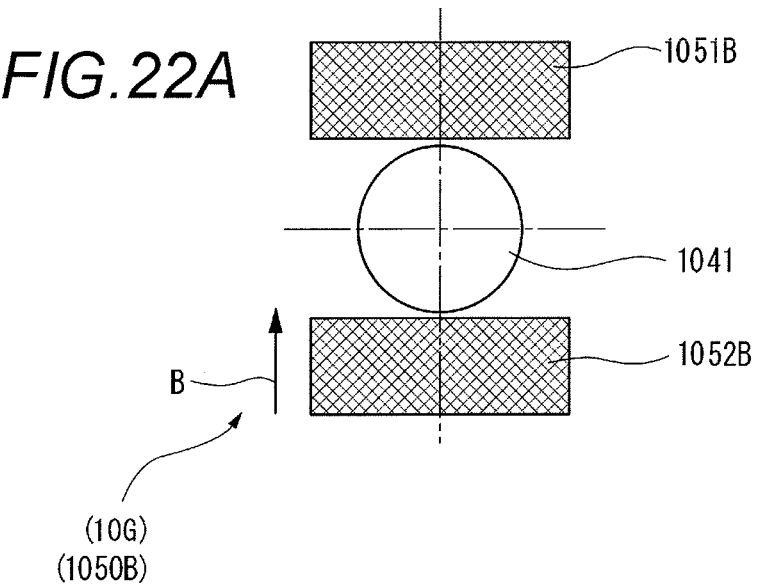
FIG. 22A is a front view of the shade plate in the retreat position of the camera apparatus according to a sixth embodiment of the present invention.
Figure 22B:
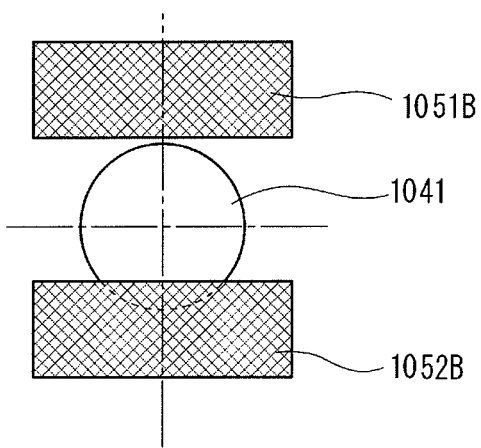
FIG. 22B is a front view of a state where the shade plate on the lower side is rotated.
Figure 22C:
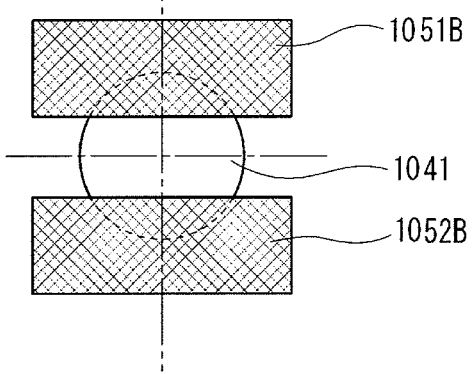
FIG. 22C is a front view illustrating the shade plate in the covered state.

As illustrated in FIGS. 22A to 22C, in a shade plate portion 1050B of a camera apparatus 10G according to the sixth embodiment, a shade plate 1051B and a shade plate 1052B individually rotate by a shade plate portion step.

As illustrated in FIG. 22A, firstly, the shade plate 1052B on a lower side in the retreat state is rotated upward (refer to arrow B in FIG. 22A) to be in the covered state.

As illustrated in FIG. 22B, if the shade plate 1052B on the lower side rotates to a predetermined position and covers a lower portion of the lens 1041, the shade plate 1051B on the upper side is rotated downward.

In this manner, as illustrated in FIG. 22C, the upper portion and the lower portion of the lens 1041 are in the covered state and the central portion (portion excluding upper portion and lower portion) of the lens 1041 is not in the covered state, and thus, the central portion of a wide imaging area can be incident on the image pickup device. Therefore, it is possible to cause the image not to be too dark.

It is also possible to cover different regions (area) in the upper portion and the lower portion of the lens 1041 by the shade plate portion step in the covered state.

Hereinbefore, in the camera apparatus 10G according to the sixth embodiment described above as well, it is possible to achieve the effect same as the camera apparatus 10G according to the fifth embodiment.

Moreover, when the camera unit 1040 is inverted by 180 degrees about the second rotating shaft 1035, it is possible to cause the upper portion of the lens 1041 to be in the covered state.

(Seventh Embodiment)

Next, a camera apparatus and a method of controlling a camera apparatus according to a seventh embodiment of the present invention will be described.

The same reference numerals and signs are applied to the portions common with the camera apparatus 10F according to the fifth embodiment and the camera apparatus 10G according to the sixth embodiment described above, thereby omitting the repeated description.

Figure 23:
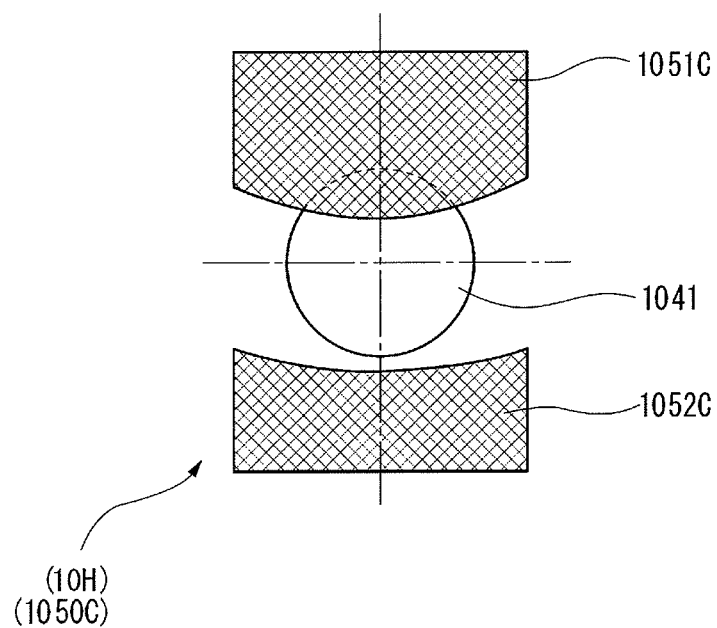
FIG. 23 is a front view of the shade plate of the camera apparatus according to a seventh embodiment of the present invention.

As illustrated in FIG. 23, in a shade plate portion 1050C of a camera apparatus 10H according to the seventh embodiment of the present invention, a lower end portion of the shade plate 1051C on an upper side is in an arc shape being convex downward. And an upper end portion of the shade plate 1051C on a lower side is in the arc shape being concave downward.

As a method of rotating the shade plate 1051C on the upper side and the shade plate 1052C on the lower side, it is possible to move the shade plates in a synchronized manner similar to the shade plates 1051A and 1052A in the fifth embodiment described above. Otherwise, similar to the shade plates 1051B and 1052B in the sixth embodiment described above, when the shade plate 1052C on the upper side rotates to a predetermined position and covers the upper portion of the lens 1041, the shade plate 1052C on the lower side can be rotated downward.

It is also possible to switch the shapes between the shade plate 1051C on the upper side and the shade plate 1052C on the lower side. In other words, it is possible that the lower end portion of the shade plate 1051C on the upper side is in the arc shape being concave upward, and the upper end portion of the shade plate 1052C on the lower side is in the arc shape being convex upward.

Hereinbefore, in the camera apparatus 10H according to the seventh embodiment described above as well, it is possible to achieve the effect same as the camera apparatus 10F according to the sixth embodiment.

Moreover, it is possible to cover regions in different shapes from each other in the upper portion of the lens 1041 and the lower portion of the lens 1041, and thus, it is possible to obtain the most suitable image in accordance with the subject and achieve improvement in the monitoring ability.

The camera apparatus according to the present invention is not limited to each of the embodiments described above, thereby being possible to be appropriately changed, modified and the like.

For example, in each of the embodiments described above, the cases where the upper and lower end portions of the lens 1041 are covered by the pair of shade plates 1051A (1051B, 1051C) and 1052A (1052B, 1052C) are described. In addition to this, if the image quality is deteriorated by the end portions (right and left end portions) of the lens 1041 in the horizontal direction, it is possible to cover the right and left end portions of the lens 1041 by the shade plates which rotate laterally.

In addition, in each of the embodiments described above, as illustrated in FIG. 20, the case where the second rotating shaft 1035 which is the rotating center of the camera unit 1040 is provided to be offset downward from the center CP of the hemispherical cover 1023 is described.

In addition to this, it is also possible to apply a case of being offset upward from the center CP or a case of being offset in the horizontal direction (lateral direction in FIG. 20) in the similar manner.

Figure 24:
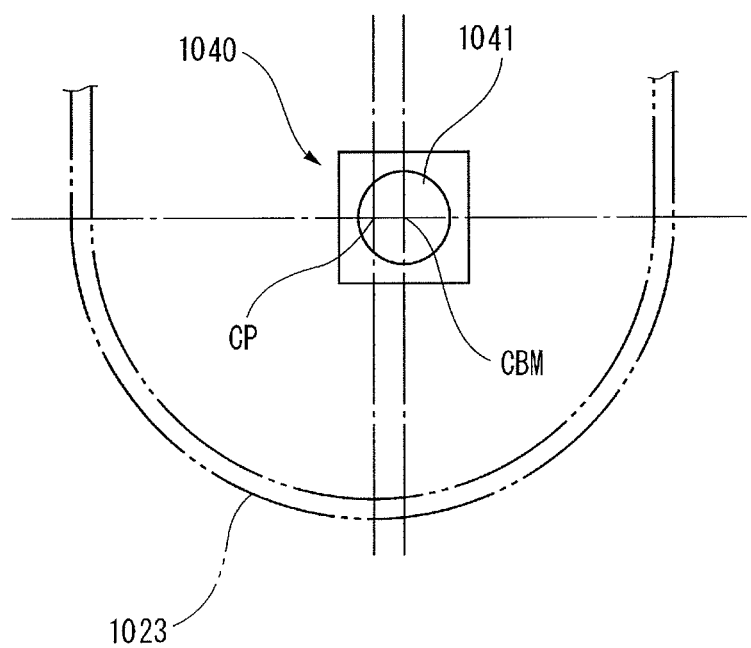
FIG. 24 is a front view of a state where a second rotating shaft is offset from the center of the cover in the horizontal direction.

In addition, as illustrated in FIG. 24, it is possible to apply a case where the optical axis CBM of the camera unit 1040 is offset in the horizontal direction (lateral direction in FIG. 24) from the center CP.

In addition, in each of the embodiments described above, although the case where the hemispherical cover 1023 is included and the second rotating shaft 1035 is offset downward from the center CP of the cover 1023 is described, a case in other shapes can be applied.

Figure 25A:
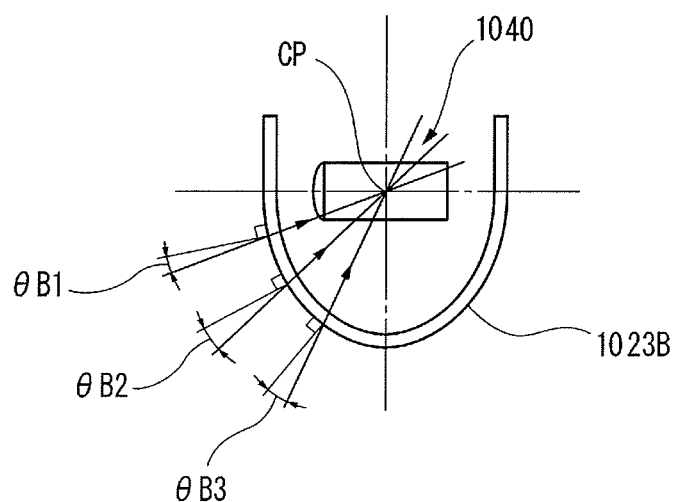
FIG. 25A is a cross-sectional view illustrating a cover in a semi-elliptical shape.

For example, as illustrated in FIG. 25A, when a semi-elliptical cover 1023B is included, penetration angles θB1, θB2 and θB3 in the cover 1023B are different from each other, and thus, it is possible to be applied.

Figure 25B:
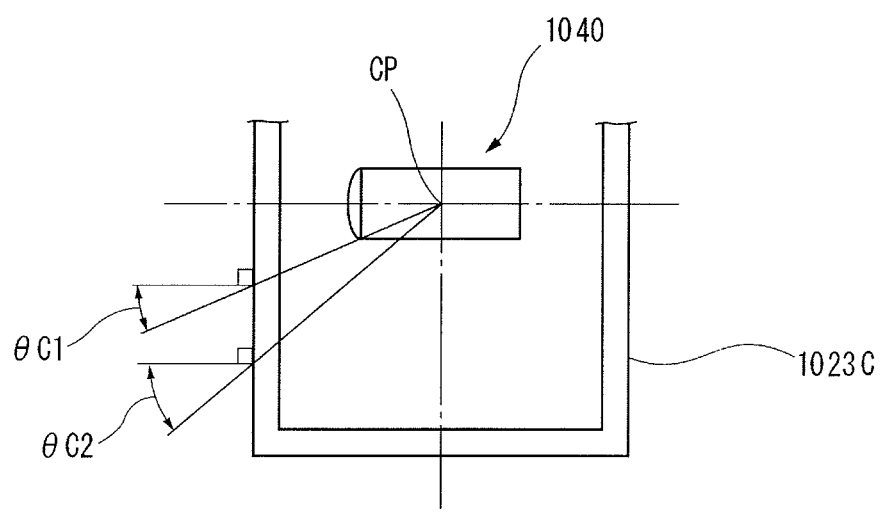
FIG. 25B is a cross-sectional view illustrating a cover in a cylindrical shape.

In addition, as illustrated in FIG. 25B, when a cylindrical cover 1023C is included, penetration angles θC1 and θC2 in the cover 1023C are different from each other, and thus, it is possible to be applied.

Likewise the semi-elliptical cover 1023B and the cylindrical cover 1023C described above, when the cover is in a shape in which the penetration angles are different from each other in one and the other on opposite sides having the optical axis of the camera unit as a center, a case where the second rotating shaft is not offset from the center of the cover can be applied as well.

The shade plates in each of the embodiments can be controlled using a controller and the like outside (distanced location) the camera apparatus.

(Eighth Embodiment)

In the related art, in camera apparatuses such as a monitoring camera, it is generally accepted that a camera lens is rotated in a pan direction and a tilt direction for imaging (for example, refer to JP-A-2012-103452).

As illustrated in FIG. 17, a dome-type camera 100 disclosed in JP-A-2012-103452 includes a hemispherical dome cover 101. Inside the dome cover 101, a lens unit 103 having a camera lens 102 is accommodated.

In the dome-type camera 100, there are provided a pan motor and a tilt motor. The lens unit 103 is rotatable in the pan direction and the tilt direction.

In this dome-type camera 100, in order to prevent vignetting from generating when imaging in a direction at a large tilt angle (direction close to horizontal direction), the lens unit 103 is offset from the center of the spherical dome cover 101 to an apex direction. If the lens unit 103 is offset from the center of the spherical dome cover 101, aberration occurs due to a lens effect of the dome cover 101. This aberration causes an image to be projected in an overlapping manner, thereby being deteriorated in image quality as the photograph in FIG. 18B.

This phenomenon still occurs, even if the lens unit 103 is not offset, when a cylindrical portion is provided on an upper side of a hemispherical portion of the dome cover 101 as in FIG. 18A. This is because when the lens unit 103 is at an angle close to the horizontal level, penetration angle α1 of light L1 penetrating the dome cover 101 on an upper side of an optical axis CBM and penetration angle α2 of light L2 penetrating the dome cover 101 on a lower side thereof are different from each other, causing positions of focal points F1 and F2 to deviate from each other.

In order to improve this deterioration in the image quality, as illustrated in FIG. 17, a partial shade filter 104 is included in the lens unit 103. An arc-shaped guide portion 105 is provided in an end portion of the partial shade filter 104 through a support piece 106. Two guide pins 107 are respectively provided on each of side surfaces of the guide portion 105 on the right and left. A pair of guide plates 108 are provided in an upper portion of the lens unit 103 on the right and left. The guide pin 107 of the guide portion 105 is inserted into an arc-shaped long hole 109 which is provided in the guide plate 108 in a slidable manner.

Accordingly, the partial shade filter 104 reciprocates between an insertion position and a retreat position and blocks one side of light incident on an image pickup device, and thus, it is possible to prevent the overlapping of the images.

However, in a camera apparatus (dome-type camera 100) in the related art, a partial shade filter 104 is disposed in a front surface of the camera lens 102 to be attached to the lens unit 103 which pans and tilts.

For this reason, there are disadvantages that a space is greatly limited and the shading structure becomes complicated. In addition, since the shade plate itself moves due to a tilting operation of the camera lens 102, it is necessary to perform controlling to a position in which an amount of tilting operation of the camera lens 102 is subtracted, thereby causing a disadvantage in that controlling becomes troublesome.

A non-limited object is to provide a camera apparatus that can obtain the most suitable image by obtaining the shading amount in accordance with the position of the camera through a simple structure and easy controlling, and a method of controlling a camera apparatus.

Hereinafter, a camera apparatus and a method of controlling a camera apparatus according to an eighth embodiment of the present invention will be described with reference to the drawings.

Figure 27:
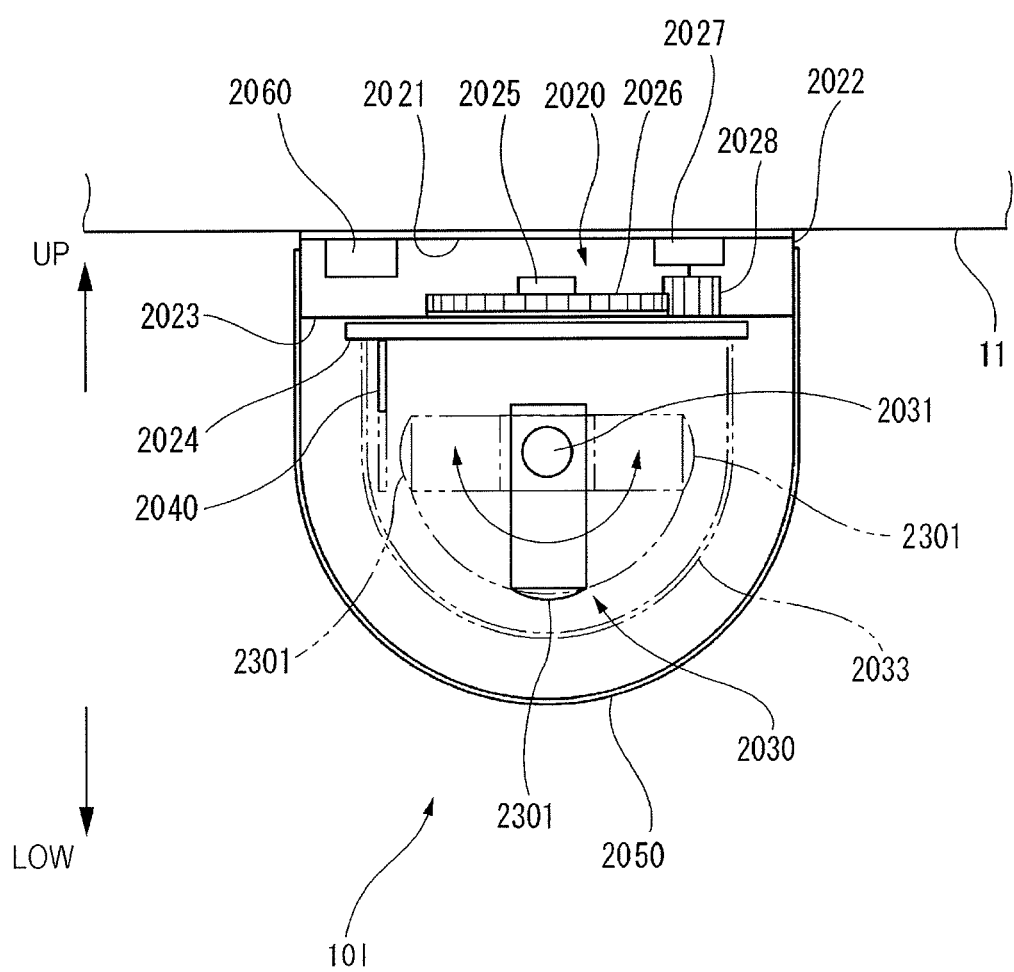
FIG. 27 is a cross-sectional view of a state where the camera apparatus is attached on a ceiling surface according to an eighth embodiment of the present invention.

As illustrated in FIG. 27, a camera apparatus 10I according to the eighth embodiment, for example, is attached to a ceiling surface 11 which is an attachment surface and can be used as a monitoring camera which can monitor lower regions by 360 degrees from the ceiling surface 11 in a pan direction (horizontal direction).

In the description below, it is considered that the ceiling surface 11 is an upper side and the opposite side of the ceiling surface 11 is the lower side.

The camera apparatus 10I has a pillar box-shaped body 2020 which can be attached to the ceiling surface 11. The body 2020 has a disk-shaped base 2021 which is attached to the ceiling surface 11, an approximately cylindrical side plate 2022 which is attached to a lower side of the base 2021, and a top plate 2023 which is provided in a lower end of the side plate 2022.

In the top plate 2023 of the body 2020, a pan table 2024 is attached rotatably in a pan direction about a pan rotating shaft 2025. The pan rotating shaft 2025 passes through the top plate 2023, and a first gear 2026 is attached to an upper end portion of the pan rotating shaft 2025 inside the body 2020.

In addition, a pan table motor 2027 is provided inside the body 2020, and a second gear 2028 which meshes with the first gear 2026 is attached to the pan table motor 2027.

A camera unit 2030 is attached to a lower surface of the pan table 2024. The camera unit 2030 has a lens 2301 in its tip. In the rear of the lens 2301, the camera unit 2030 has an image pickup device 2302 (refer to FIG. 8), which converts image-formed data into an electrical signal.

Figure 30:
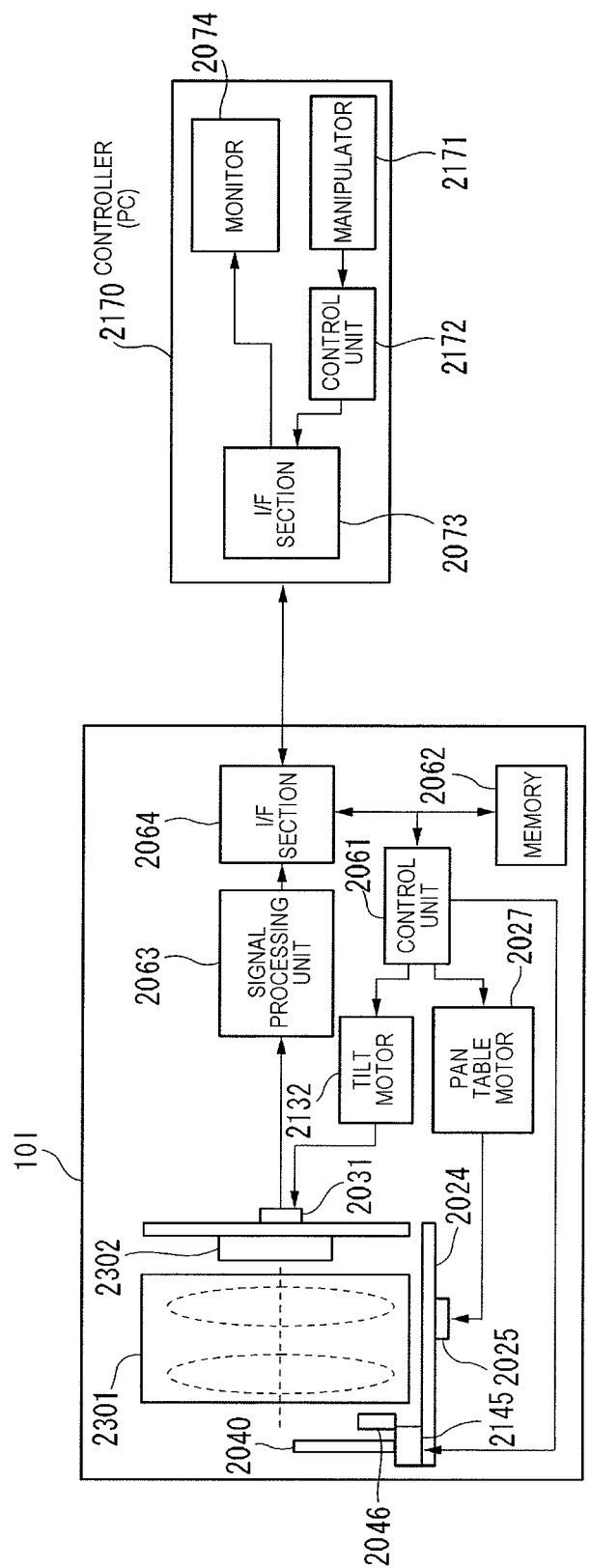
FIG. 30 is a block diagram of a control device.

The camera unit 2030 is supported to be rotatable by 180 degrees in the tilt direction (vertical direction) having the tilt rotating shaft 2031 as the center and is rotated by a tilt motor 2132 (refer to FIG. 30).

Figure 28:
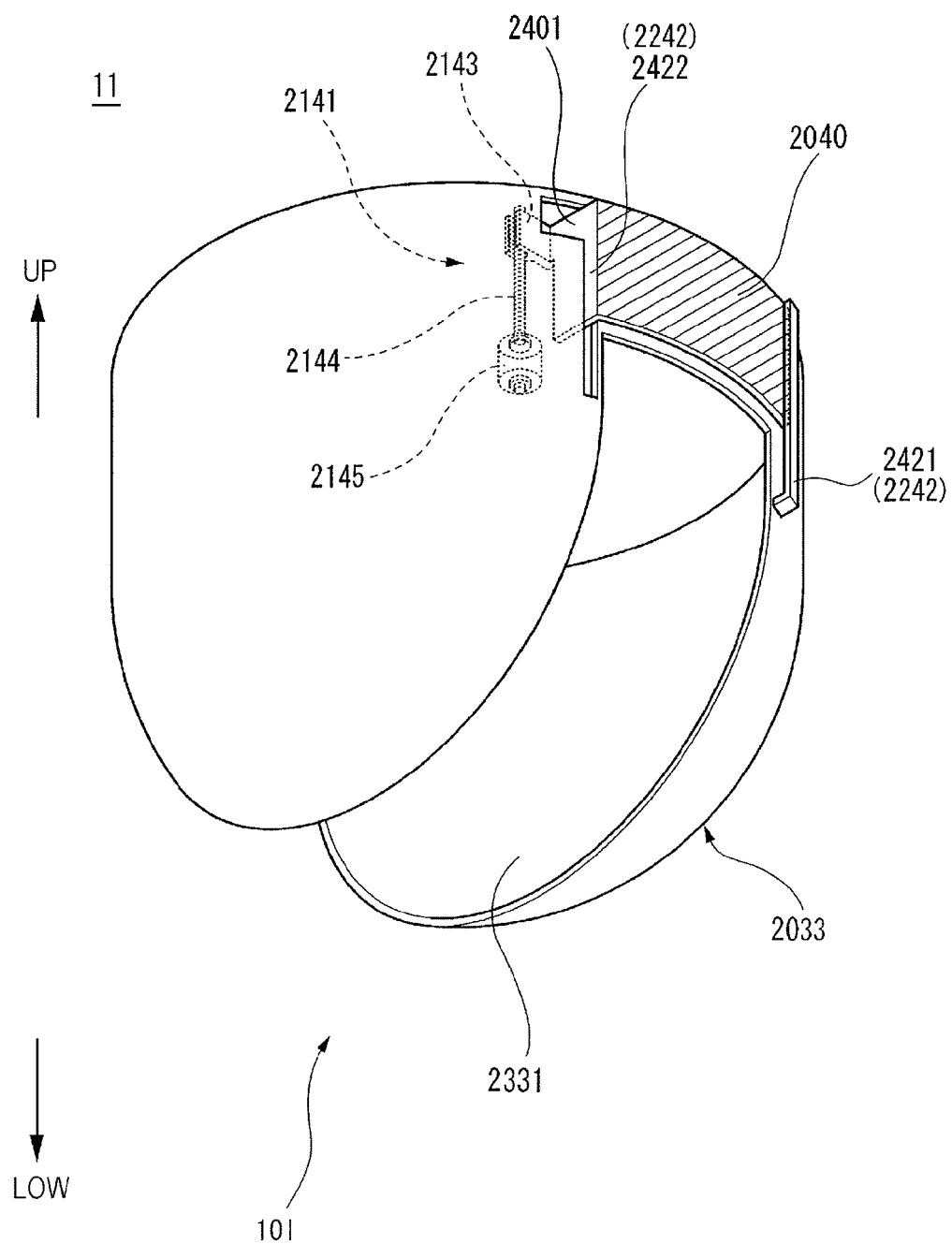
FIG. 28 is a perspective view of the shade plate and an inner dome cover attached to a pan table.

As illustrated in FIG. 28 as well, a non-transparent inner dome cover 2033 which accommodates the camera unit 2030 is provided in a lower surface of the pan table 2024. The inner dome cover 2033 is in an approximately hemispherical shape in its entirety, and an opening portion 2331 is provided in front of the tilting camera unit 2030 along the tilt direction.

Figure 29A:
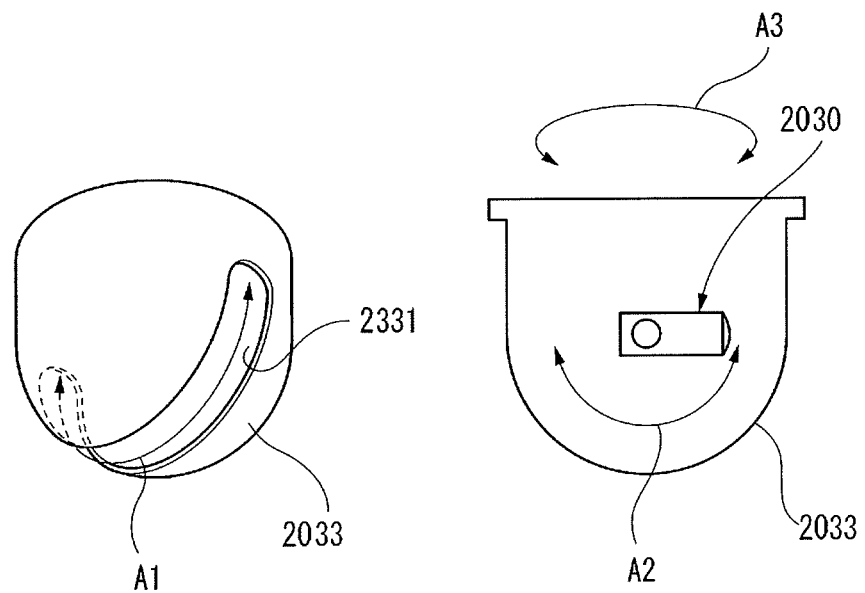
FIG. 29A is a perspective view and a cross-sectional view illustrating a tilt rotating angle and a pan rotating angle when an opening portion of the inner dome cover is set at 180 degrees.

In the present embodiment, as illustrated in FIG. 29A, a case where the opening portion 2331 of the inner dome cover 2033 is provided to be rotatable by 180 degrees (arrow A1 in FIG. 29A) will be mainly described.

This is a case where the camera unit 2030 rotates (inverted) in the tilt direction (arrow A2 in FIG. 29A) by 180 degrees, and the pan table 2024 is rotatable in the pan direction (arrow A3 in FIG. 29A) by 180 degrees.

Accordingly, it is possible for the camera apparatus 10I to perform imaging lower regions of the ceiling surface 11 in all directions.

Figure 29B:
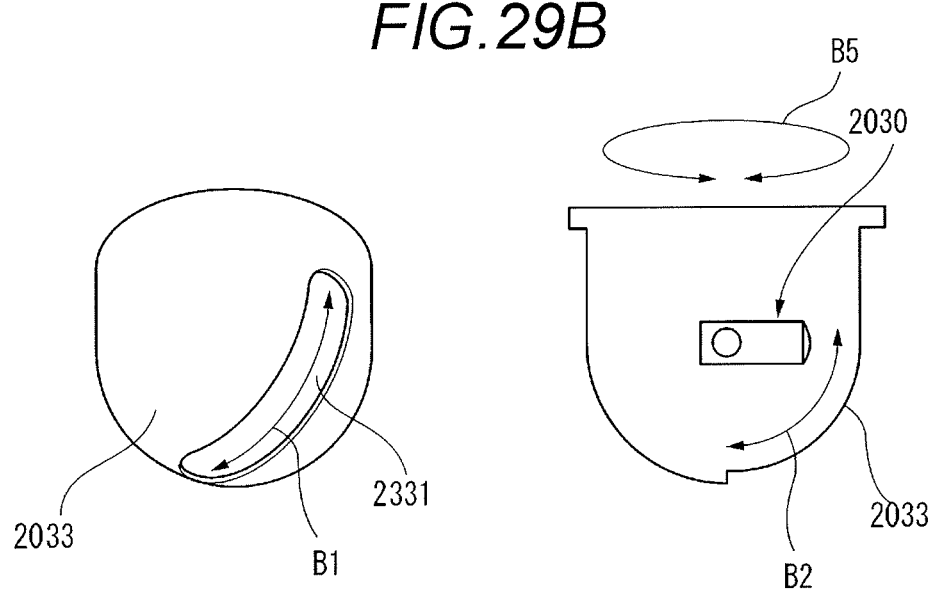
FIG. 29B is a perspective view and a cross-sectional view illustrating the tilt rotating angle and the pan rotating angle when the opening portion of the inner dome cover is set at 90 degrees.

As illustrated in FIG. 29B, it is also possible to adopt a case where the opening portion 2331 of the inner dome cover 2033 is provided to be rotatable by 90 degrees (arrow B1 in FIG. 29B). This is a case where the camera unit 2030 rotates in the tilt direction (arrow B2 in FIG. 29B) by 90 degrees, and the pan table 2024 is rotatable in the pan direction (arrow B3 in FIG. 29B) by 360 degrees.

As illustrated in FIGS. 27 and 28, a shade plate 2040 which covers the front of the lens 2301 of the camera unit 2030 and selectively and partially shades light incident on the camera unit 2030 is provided in the pan table 2024. Therefore, the shade plate 2040 rotates integrally with the camera unit 2030 in the pan direction at all times by the rotating of the pan table 2024.

The shade plate 2040 is attached to the inner dome cover 2033 which is attached to the pan table 2024 through the shade plate elevating unit 2141 and movable in an orthogonal direction (that is, vertical direction) with respect to the pan table 2024.

Hereinafter, a case where the shade plate 2040 is attached to the inner dome cover 2033 will be mainly described.

The shade plate elevating unit 2141 has the shade plate 2040 and a guide portion 2242 which guides elevating of the shade plate 2040. The shade plate 2040 is a plate-shaped member which has a radius approximately the same as an outer peripheral surface of the inner dome cover 2033 and is bent in a circle shape. The shade plate 2040 is provided inside or outside the inner dome cover 2033 along the inner dome cover 2033.

FIG. 28 illustrates a case where the shade plate 2040 is provided outside the inner dome cover 2033. A guide rail 2421 which guides the shade plate 2240 is provided in the vertical direction in one end portion of the inner dome cover 2033 along the opening portion 2331.

A guide groove 2422 is provided along the vertical direction in the other end portion of the inner dome cover 2033 along the opening portion 2331. A rib 2401, which is formed to be inwardly folded from the end portion of the shade plate 2040, extends inward the inner dome cover 2033 through the guide groove 2422.

Accordingly, the shade plate 2040 is supported to be capable of elevating with respect to the inner dome cover 2033 through the guide rail 2421 and the guide groove 2422.

A nut member (gear portion) 2143 is attached to the rib 2401, and a screw member (gear portion) 2144 which is provided in the nut member 2143 to be screwed in the vertical direction. The screw member 2144 is rotationally driven by a shade plate motor 2145.

Therefore, when the shade plate motor 2145 rotates the screw member 2144, the nut member 2143 screwed to the screw member 2144 is elevated, thereby elevating the shade plate 2040.

An origin sensor 2046 (refer to FIG. 30) which detects that the shade plate 2040 is in an original position (upper end) is provided in the inner dome cover 2033 side, thereby sending a signal to a control device 2060 by detecting the shade plate 2040.

Accordingly, the shade plate 2040 can be accurately positioned, and thus, it is possible to control the shading rate at high accuracy.

As illustrated in FIG. 27, a transparent outer dome cover 2050 which includes the camera unit 2030, the inner dome cover 2033 and the like and is in an approximately hemisphere shape is detachably attached to the body 2020.

As illustrated in FIG. 30, the camera apparatus 10I has a control unit 2061, a memory 2062, a signal processing unit 2063 and an I/F section 2064. The control unit 2061 controls a pan table motor 2027, a tilt motor 2132 which rotates the camera unit 2030 in the tilt direction, and a shade plate motor 2145 which elevates the shade plate 2040 by rotating. The memory 2062 stores posture information including an imaging direction of the camera unit 2030 and positional information on the shade plate 2040. The signal processing unit 2063 performs video image signal processing such as a γ correction and a gain correction with respect to the signal from the image pickup device 2302, thereby outputting the processed signal to the I/F section 2064. The I/F section 2064 is connected to an external controller (PC) 2170 from the outside through a network and transmits the video image signal from the signal processing unit 2063 while transmitting a control signal from the controller (PC) 2170 to the control unit 2061.

Meanwhile, a manipulator 2171, a control unit 2172, an I/F section 2073 and a monitor 2074 are provided in the controller (PC) 2170.

The I/F section 2073 is connected to the I/F section 2064 of the camera apparatus 10I through the network and receives the image signal from the camera apparatus 10I, thereby outputting to the monitor 2074. The monitor 2074 outputs the received image signal to a screen through the I/F section 2073. In addition, the manipulator 2171 inputs a signal to remotely control an elevating amount (position in height) of the shade plate 2040. The control unit 2172 receives and analyzes the signal from the manipulator 2171 and transmits a control signal for controlling the shade plate 2040 to the camera apparatus 10I through the I/F section 2073.

Accordingly, the controller (PC) 2170 controls an angle in the pan direction and an angle in the tilt direction of the camera unit 2030, thereby controlling a posture of the camera unit 2030. In addition, the controller (PC) controls the position in height of the shade plate 2040, thereby adjusting the shading rate.

Next, a method of controlling a camera apparatus 10I will be described.

Firstly, in a storing step, various pieces of information are stored in the memory 2062.

In other words, as illustrated in FIG. 6, the posture information of the camera unit 2030 with respect to the preset number indicating a specific imaging direction and a position in height which is information on the shade plate portion of the shade plate 2040 are stored in the memory 2062.

The above-described information stored in the memory 2062 is set, after the camera apparatus 10I is installed, through the controller 2170 operated by a person away from the place.

In other words, the person causes the camera unit 2030 to be oriented in the intended direction for imaging by the controller 2170, and controls the position of the shade plate 2040 so as to reduce the overlapping of the image and so as not to be too dark, as watching the video image captured by the camera unit 2030 through the monitor 2074 thereby adjusting the shading rate.

In this manner, after completing adjustment for the posture information indicating the imaging direction of the camera unit 2030 and the information on the shade plate portion of the shade plate 2040, the person stores the posture information on the camera unit 2030 and the information on the shade plate portion of the shade plate 2040 together with the preset number to the memory 2062 using a set button and the like in the manipulator 2171 of the controller 2170.

This process is performed from the preset number 1 to a preset number N, thereby creating a table illustrated in FIG. 6 to store the information in the memory 2062.

As the posture information on the camera unit 2030, for example, there are a pan angle P with respect to the reference position (not illustrated) of the pan table 2024, a tilt angle T of the camera unit 2030, a zoom information Z, a focus information F and the like.

In addition, as the information on the shade plate portion, for example, there is a shading rate M decided by the elevating position of the shade plate 2040.

Here, as illustrated in FIG. 7, the shading rate M can be indicated in a rate (%) of an area of the lens 2301 which is covered by the shade plate 2040.

Therefore, it is considered that the shading rate M=0 when the shade plate 2040 is in the retreat state so that it is possible to obtain the brightness by 100%. This retreat state is easily detected at the high accuracy by the origin sensor 2046 detecting the shade plate 2040.

Next, in a step of controlling when performing the imaging, when the person selects the preset number 1 through the controller 2170, the control unit 2061 performs imaging by causing the camera unit 2030 to be oriented to a subject (front door, for example) of the preset number 1 which is stored in the memory 2062, as illustrated in FIG. 6.

In other words, the control unit 2061 controls the pan table motor 2027 to rotate the pan table 2024 in the pan angle P1 position. In addition, the control unit 2061 controls the tilt motor 2132 to rotate the camera unit 2030 in the tilt angle T1 position. At the same time, zoom and focus control is performed for a zoom position Z1 and a focus position (focal portion) F1.

Moreover, the control unit 2061 controls the shade plate motor 2145 to elevate the shade plate 2040 (step of shade plate).

Accordingly, it is possible for the preset number 1 to be set in the covered state so as to obtain the shading rate by 10%.

Next, when the person selects the preset number 2 through the controller 2170, the control unit 2061 performs imaging by causing the camera unit 2030 to be oriented to a subject (reception desk, for example) of the preset number 2 which is stored in the memory 2062.

In other words, the control unit 2061 controls the pan table motor 2027 to rotate the pan table 2024 in the pan angle P2 position. In addition, the control unit 2061 controls the tilt motor 2132 to rotate the camera unit 2030 in the tilt angle T2 position. At the same time, zoom and focus control is performed for a zoom position Z2 and a focus position (focal portion) F2.

Moreover, the control unit 2061 controls the shade plate motor 2145 to elevate the shade plate 2040.

Accordingly, it is possible for the preset number 2 to be set in the covered state of the shading rate M=0%. At this time, the origin sensor 2046 detects that the shade plate 2040 is in the original position.

The shade plate 2040 may be controlled manually by not only operating with the preset number but also operating the manipulator 2171 of the controller 2170 as needed by the person watching the monitor 2074.

Next, a captured image in the covered state where a portion of the front surface of the lens 2301 is covered by the shade plate 2040 will be described.

As illustrated in FIG. 8, when a magnification of the lens 2301 is set in a telephoto, even if the upper end portion of the lens 2301 is covered by the shade plate 2040, although there is a decrease in an overall amount of light, there is no damage to the image since the light from the subject reaches the image pickup device 2302 through the lower end portion of the lens 2301 which is not covered by the shade plate 2040.

In other words, as illustrated in FIG. 10A, it is possible to shade the light L1 above the optical axis CBM using the shade plate 2040. Accordingly, only light L2 below the optical axis CBM is incident on the lens 2301, and thus, as illustrated in FIG. 10B, it is possible to shade one of the overlapping (out of focus) images and improve the image quality.

As illustrated in FIG. 9, when the magnification of the lens 2301 is set in a wide-angle, if the upper end portion of the lens 2301 is covered by the shade plate 2040, the light from an upper portion of the subject is blocked by the shade plate 2040 without reaching the image pickup device 2302, thereby resulting in occurrence of the damage to the image (indicated by dotted line in FIG. 9). Therefore, it is necessary to control the position of the shade plate 2040 in accordance with the magnification of the lens 2301.

An operation effect of the camera apparatus 10I will be described.

The pan table 2024 is provided rotatably in the pan direction inside the outer dome cover 2050. The camera unit 2030 is provided rotatably in the tilt direction in the pan table 2024. The shade plate 2040 which partially shades light incident on the camera unit 2030 is provided in the pan table 2024 capable of being elevated in the orthogonal direction by the shade plate elevating unit 2141 with respect to the pan table 2024.

Accordingly, when the pan table 2024 rotates, the shade plate 2040 rotates integrally with the camera unit 2030 in the pan direction. Therefore, the shade plate 2040 is positioned in front of the camera unit 2030 at all times, and the shade plate 2040 is elevated in accordance with the rotating of the camera unit 2030 in the tilt direction. For this reason, it is possible to obtain the most suitable images by acquiring a shading amount in response to a position of the camera unit 2030 through a simple structure and an easy control.

In addition, in the camera apparatus 10I, an inner dome cover 2033 which partially covers the inside of the outer dome cover 2050 is provided in the pan table 2024, and the shade plate 2040 is attached to the inner dome cover 2033.

Accordingly, when the pan table 2024 rotates, the shade plate 2040 rotates integrally with the inner dome cover 2033 in the pan direction. Therefore, the shade plate 2040 is positioned in front of the camera unit 2030 at all times, and the shade plate 2040 can be elevated in accordance with the rotating of the camera unit 2030 in the tilt direction.

In addition, in the camera apparatus 10I, the shade plate elevating unit 2141 has a guide portion 2242 which guides the elevating of the shade plate 2040, a nut member 2143 and a screw member 2144 which elevate the shade plate 2040, and a shade plate motor 2145 which rotationally drive the screw member 2144.

Therefore, it is possible to elevate the shade plate 2040 along the guide portion 2242 through the nut member 2143 and the screw member 2144 by rotating the shade plate motor 2145.

Next, an operation effect of a method of controlling a camera apparatus will be described.

In a step of controlling, the rotating of the pan table 2024 and the direction of the camera unit 2030 are controlled.

In a step of controlling, the rotating of the pan table 2024 and the direction of the camera unit 2030 are controlled. In addition, in the step of shading, the elevating of the shade plate 2040 with respect to the pan table 2024 is controlled.

Accordingly, it is possible to obtain the most suitable images by acquiring a shading amount in response to a position of the camera unit 2030 through a simple structure and an easy control.

In the present embodiment, the direction of the camera and the position of the shade plate 2040 are controlled using the motors, the position of the shade plate 2040 may be manually adjusted without using the motors.

The camera apparatus and the method of controlling a camera apparatus according to the present invention is not limited to the eighth embodiment described above, thereby being possible to be appropriately changed, modified and the like.

(Ninth Embodiment)

In the related art, in camera apparatuses such as a monitoring camera, it is generally accepted that a camera lens is rotated in a pan direction and a tilt direction for imaging (for example, refer to JP-A-2012-103452).

As illustrated in FIG. 17, a dome-type camera 100 disclosed in JP-A-2012-103452 includes a hemispherical dome cover 101. Inside the dome cover 101, a lens unit 103 having a camera lens 102 is accommodated.

In the dome-type camera 100, there are provided a pan motor and a tilt motor. The lens unit 103 is rotatable in the pan direction and the tilt direction.

In this dome-type camera 100, in order to prevent vignetting from generating when imaging in a direction at a large tilt angle (direction close to horizontal direction), the lens unit 103 is offset from the center of the spherical dome cover 101 to an apex direction. If the lens unit 103 is offset from the center of the spherical dome cover 101, aberration occurs due to a lens effect of the dome cover 101. This aberration causes images to be projected in an overlapping manner, thereby being deteriorated in image quality as the photograph in FIG. 18B.

This phenomenon still occurs, even if the lens unit 103 is not offset, when a cylindrical portion is provided on an upper side of a hemispherical portion of the dome cover 101 as in FIG. 18A. This is because when the lens unit 103 is at an angle close to the horizontal level, penetration angle $\alpha1$ of light L1 penetrating the dome cover 101 on an upper side of an optical axis CBM and penetration angle $\alpha2$ of light L2 penetrating the dome cover 101 on a lower side thereof are different from each other, causing positions of focal points F1 and F2 to deviate from each other.

In order to improve this deterioration in the image quality, a partial shade filter 104 is included in the lens unit 103 as illustrated in FIG. 17. An arc-shaped guide portion 105 is provided in an end portion of the partial shade filter 104 through a support piece 106. Two guide pins 107 are respectively provided on each of side surfaces of the guide portion 105 on the right and left. A pair of guide plates 108 are provided in an upper portion of the lens unit 103 on the right and left. The guide pin 107 of the guide portion 105 is inserted into an arc-shaped long hole 109 to be slidable which is provided in the guide plate 108.

Accordingly, the partial shade filter 104 reciprocates between an insertion position and a retreat position and blocks one side of light incident on an image pickup device, and thus, it is possible to prevent the overlapping of the images.

However, in a camera apparatus (dome-type camera 100) in the related art, a partial shade filter 104 is disposed in a front surface of the camera lens 102 to be attached to the lens unit 103 which pans and tilts.

For this reason, there are disadvantages that a space is greatly limited and the shading structure becomes complicated. In addition, since the shade plate itself moves due to a tilting operation of the camera lens 102, it is necessary to perform controlling to a position in which an amount of tilting operation of the camera lens 102 is subtracted, thereby causing a disadvantage in that controlling becomes troublesome.

A non limited object is to provide a camera apparatus that can obtain the most suitable image by adjusting a shading rate, thereby achieving improvement in monitoring ability, and a method of controlling a camera apparatus.

Hereinafter, a camera apparatus and a method of controlling a camera apparatus according to a ninth embodiment of the present invention will be described with reference to the drawings.

Figure 31:
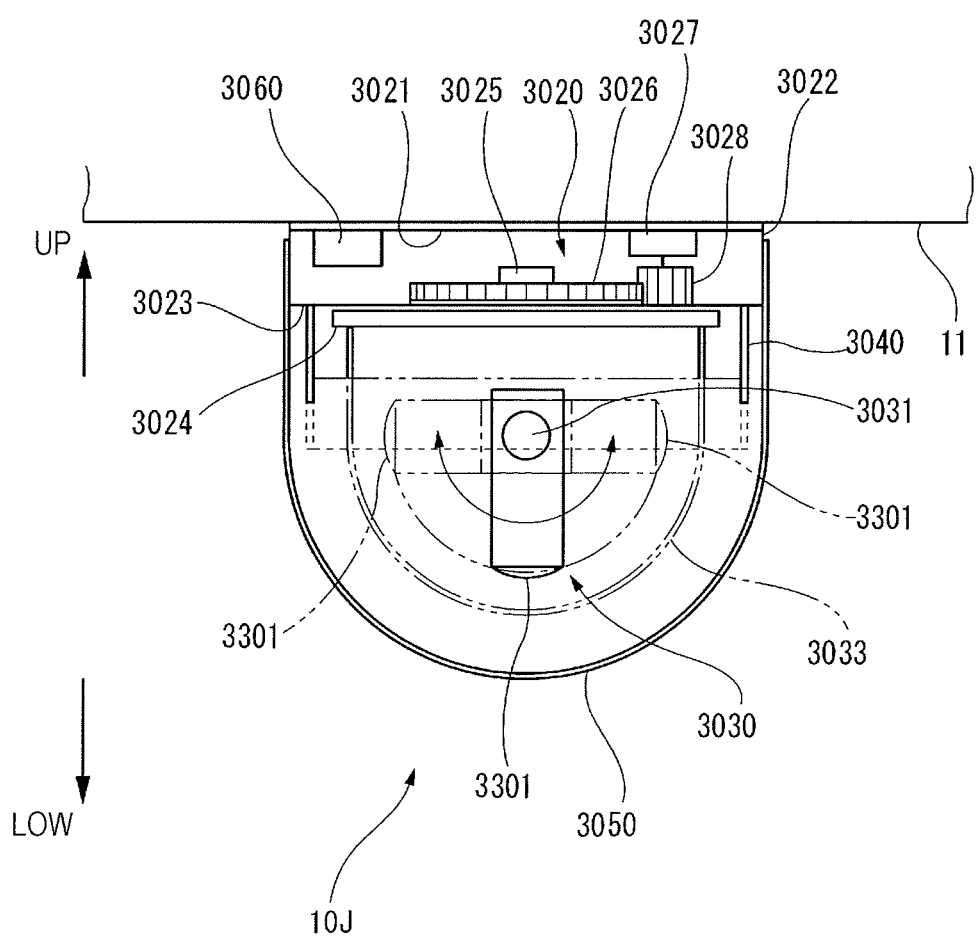
FIG. 31 is a cross-sectional view of a state where the camera apparatus is attached on a ceiling surface according to a ninth embodiment of the present invention.

As illustrated in FIG. 31, a camera apparatus 10J according to the ninth embodiment is, for example, attached to a ceiling surface 11 which is an attachment surface and can be used as a monitoring camera which can monitor lower regions by 360 degrees in a pan direction (horizontal direction) from the ceiling surface 11.

In the description below, it is considered that the ceiling surface 11 is an upper side and the opposite side of the ceiling surface 11 is the lower side.

The camera apparatus 10J has a pillar box-shaped body 3020 which can be attached to the ceiling surface 11. The body 3020 has a disk-shaped base 3021 which is attached to the ceiling surface 11, an approximately cylindrical side plate 3022 which is attached to a lower side of the base 3021, and a top plate 3023 which is provided in a lower end of the side plate 3022.

In the top plate 3023 of the body 3020, a pan table 3024 is attached rotatably in a pan direction about a pan rotating shaft 3025. The pan rotating shaft 3025 passes through the top plate 3023, and a first gear 3026 is attached to an upper end portion of the pan rotating shaft 3025 inside the body 3020.

In addition, a pan table motor 3027 is provided inside the body 3020, and a second gear 3028 which meshes with the first gear 3026 is attached to the pan table motor 3027.

A camera unit 3030 is attached to a lower surface of the pan table 3024. The camera unit 3030 has a lens 3301 in its tip. In the rear of the lens 3301, the camera unit 3030 has an image pickup device 3302 (refer to FIG. 8), which converts image-formed data into an electrical signal.

Figure 34:
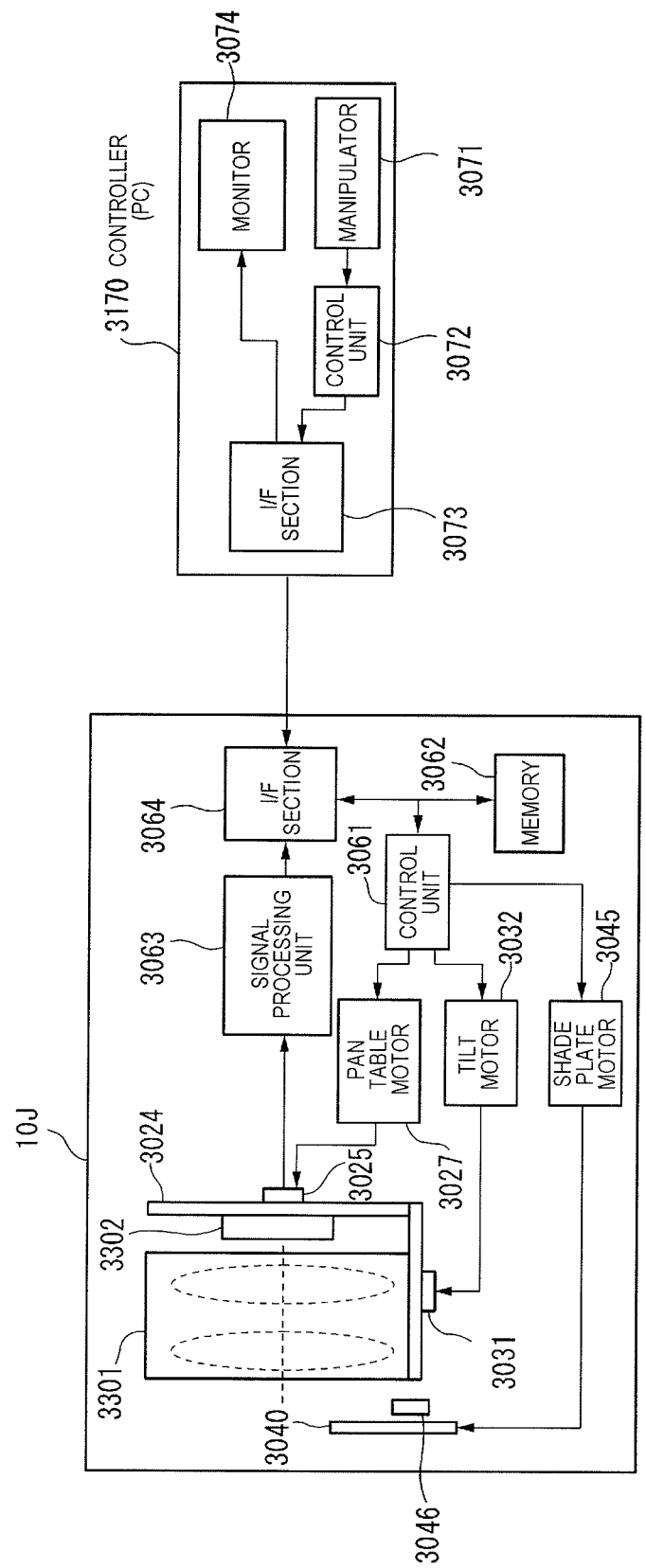
FIG. 34 is another block diagram of the control device.

The camera unit 3030 is supported to be rotatable by 180 degrees in the tilt direction (vertical direction) having the tilt rotating shaft 3031 as the center and is rotated by a tilt motor 3032 (refer to FIG. 34).

Figure 32:
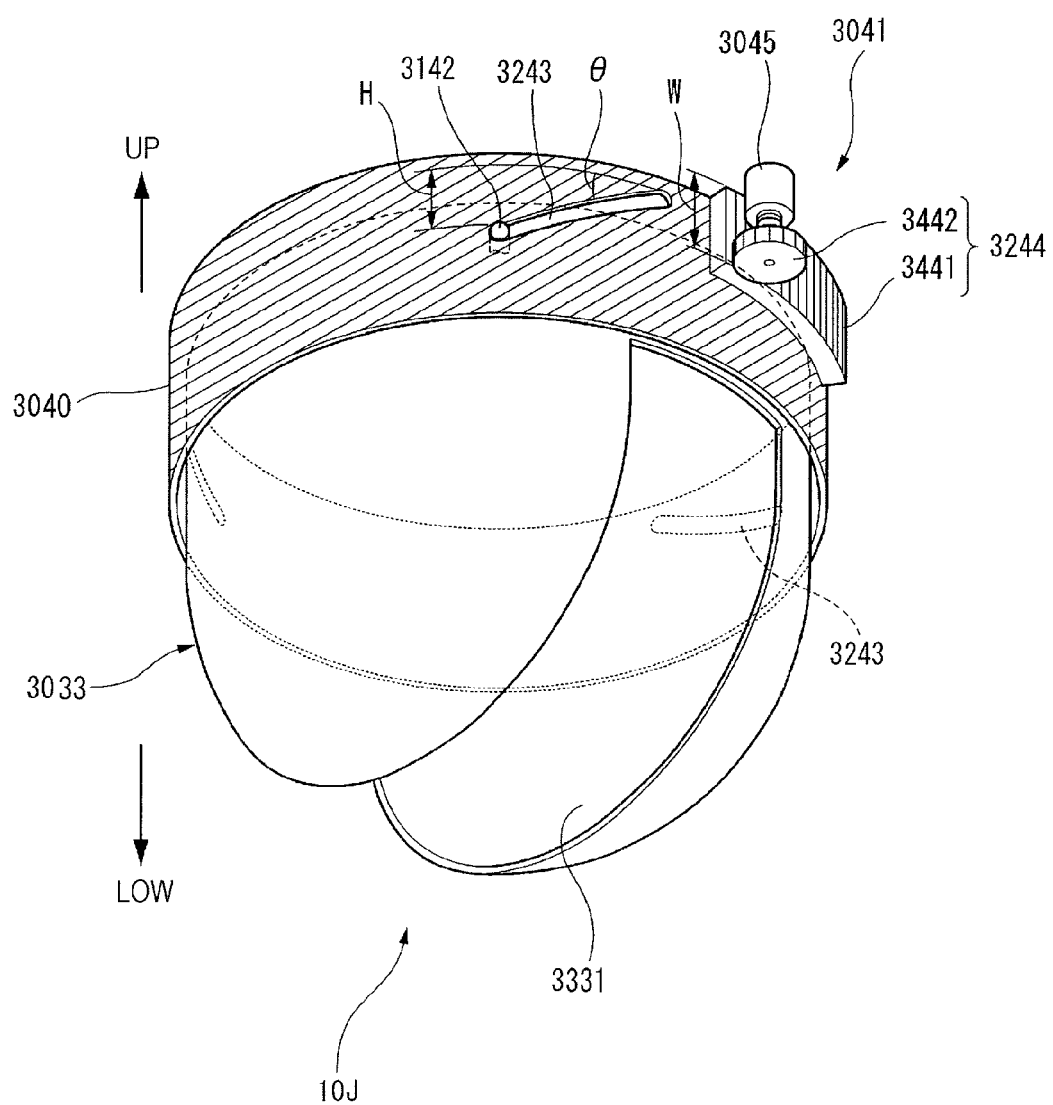
FIG. 32 is a perspective view illustrating a state where the shade plate provided outside the inner dome cover is in an original position.
Figure 33:
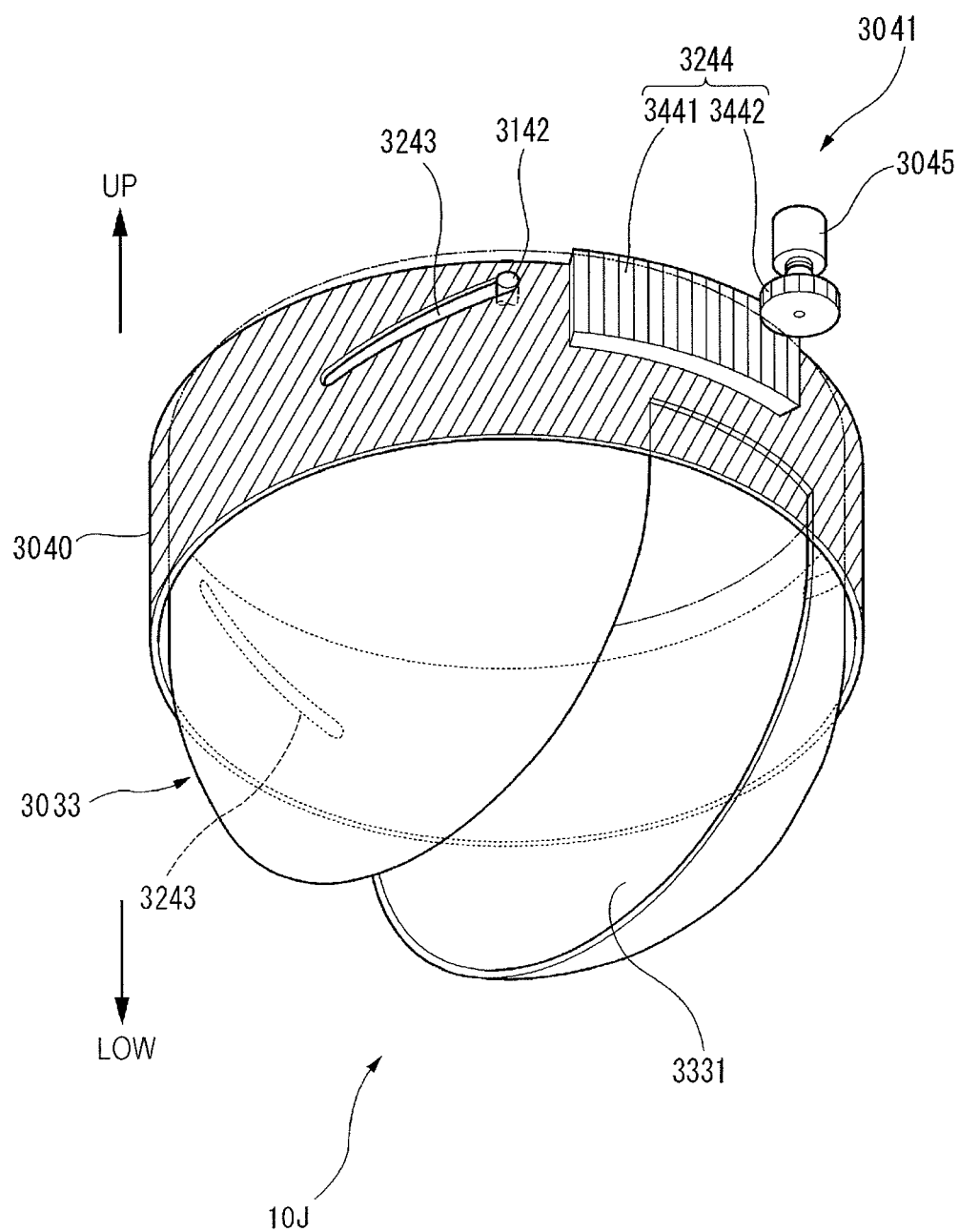
FIG. 33 is a perspective view illustrating a state where the shade plate provided outside the inner dome cover is lowered.

As illustrated in FIGS. 32 and 33 as well, a non-transparent inner dome cover 3033 which accommodates the camera unit 3030 is provided in a lower surface of the pan table 3024. The inner dome cover 3033 is in an approximately hemispherical shape in its entirety, and an opening portion 3331 is provided in front of the tilting camera unit 3030 along the tilt direction.

In the present embodiment, as illustrated in FIG. 29A, a case where the opening portion 3331 of the inner dome cover 3033 is provided to be rotatable by 180 degrees (arrow A1 in FIG. 29A) will be mainly described.

This is a case where the camera unit 3030 rotates (inverted) in the tilt direction (arrow A2 in FIG. 29A) by 180 degrees, and the pan table 3024 is rotatable in the pan direction (arrow A3 in FIG. 29A) by 180 degrees.

Accordingly, it is possible for the camera apparatus 10J to perform imaging lower regions of the ceiling surface 11 in all directions.

As illustrated in FIG. 29B, it is also possible to adopt a case where the opening portion 3331 of the inner dome cover 3033 is provided to be rotatable by 90 degrees (arrow B1 in FIG. 29B). This is a case where the camera unit 3030 rotates in the tilt direction (arrow B2 in FIG. 29B) by 90 degrees, and the pan table 3024 is rotatable in the pan direction (arrow B3 in FIG. 29B) by 360 degrees.

As illustrated in FIGS. 31 and 32, a shade plate 3040 which covers the front of the lens 3301 of the camera unit 3030 and selectively and partially shades light incident on the camera unit 3030 is provided in the pan table 3024 and the inner dome cover 3033.

The shade plate 3040 is in a pillar shape and is provided across the outside of the pan table 3024 and the inner dome cover 3033.

Therefore, the shade plate 3040 is positioned in front of the camera unit 3030 at all times, even if the camera unit 3030 rotates in the pan direction by the rotating of the pan table 3024.

As illustrated in FIGS. 32 and 33, the shade plate 3040 is attached to the body 3020 through the shade plate elevating unit 3141 and in the orthogonal direction (that is, vertical direction) with respect to the pan table 3024.

The shade plate elevating unit 3141 has a guide protrusion 3142 which is fixed to the body 3020 side, an inclined guide groove 3243 which is provided in the shade plate 3040 and movable along the guide protrusion 3142, a gear portion 3244 which rotates the shade plate 3040, and a shade plate motor 3145 which drives the gear portion 3244.

The guide protrusion 3142 is provided to protrude outward in a radial direction of the shade plate 3040 from the body 3020. Otherwise, it is possible to provide a support member (not illustrated) downward from the body 3020, and then, the guide protrusion 3142 can be provided to protrude outward in the radial direction from the tip of the support member.

For example, the guide protrusion 3142 can be provided with a screw portion in its tip to be inserted into the guide groove 3243 from the outside of the shade plate 3040, and thus, it is possible to easily perform the attachment by attaching through screwing on the body 3020 side.

The guide groove 3243 is linearly inclined in the vertical direction along the shade plate 3040 in the circumferential direction. An elevating amount with respect to the rotating of the shade plate 3040 is decided by an inclination angle θ of the guide groove 3243.

Therefore, if the inclination angle θ is large, the shade plate 3040 is greatly elevated by a small rotating amount. However, it is possible to easily perform sensitive height adjustment when the inclination angle θ is not too large. In addition, the difference in height between both of end portions of the guide groove 3243 is an available amount H for elevating the shade plate 3040.

A pair of the guide protrusion 3142 and the guide groove 3243 are provided in a symmetrical position with respect to the center of the cylindrical shade plate 3040. Otherwise, it is possible to provide in more than three places along the circumferential direction of the shade plate 3040.

The gear portion 3244 has an arc-shaped shade plate side gear 3441 which is provided along the outer peripheral surface of the shade plate 3040 in the circumferential direction, and a motor side gear 3442 which is attached to a rotational shaft of the shade plate motor 3145 and meshes with the shade plate side gear 3441.

Therefore, when the shade plate motor 3145 rotates the motor side gear 3442, the shade plate side gear 3441 which is attached to the shade plate 3040 is moved in the circumferential direction, and thus, the shade plate 3040 rotates in the circumferential direction. In this case, since the guide protrusion 3142 is fixed to the body 3020 side, in accordance with the rotating of the shade plate 3040, the guide groove 3243 is elevated with respect to the guide protrusion 3142. Accordingly, the shade plate 3040 is elevated.

As illustrated in FIG. 33, when the shade plate 3040 is lowered, the shade plate side gear 3441 is lowered integrally therewith so that the motor side gear 3442 of the shade plate motor 3145 is relatively raised. Therefore, a width dimension W of the shade plate side gear 3441 in the vertical direction is caused to be larger than the available amount H for elevating, in order to prevent the motor side gear 3442 from being detached from the shade plate side gear 3441.

In addition, an origin sensor 3046 (refer to FIG. 34) which detects that the shade plate 3040 is in an original position (upper end) is provided in the body 3020 side, thereby sending a signal to a control device 3060 (refer to FIG. 34) by detecting the shade plate 3040.

Accordingly, the shade plate 3040 can be accurately positioned, and thus, it is possible to control the shading rate at high accuracy.

As illustrated in FIG. 31, a transparent outer dome cover 3050 which includes the camera unit 3030, the inner dome cover 3033 and the like and is in an approximately hemisphere shape is detachably attached to the body 3020.

The shade plate 3040 which is provided outside the inner dome cover 3033 is positioned along the inside of the outer dome cover 3050.

As illustrated in FIG. 34, the camera apparatus 10J has a control unit 3061, a memory 3062, a signal processing unit 3063 and an I/F section 3064. The control unit 3061 controls a pan table motor 3027, a tilt motor 3032 which rotates the camera unit 3030 in the tilt direction, and a shade plate motor 3145 which elevates the shade plate 3040 by rotating. The memory 3062 stores posture information including an imaging direction of the camera unit 3030 and positional information on the shade plate 3040. The signal processing unit 3063 performs video image signal processing such as a γ correction and a gain correction with respect to the signal from the image pickup device 3302, thereby outputting to the I/F section 3064. The I/F section 3064 is connected to an external controller (PC) 3170 from the outside through a network and transmits the video image signal from the signal processing unit 3063 while transmitting a control signal from the controller (PC) 3170 to the control unit 3061.

Meanwhile, a manipulator 3171, a control unit 3172, an I/F section 3073 and a monitor 3074 are provided in the controller (PC) 3170.

The I/F section 3073 is connected to the I/F section 3064 of the camera apparatus 10J through the network and receives the image signal from the camera apparatus 10J, thereby outputting the signal to the monitor 3074. The monitor 3074 outputs the received image signal to a screen through the I/F section 3073. In addition, the manipulator 3171 inputs a signal to remotely control an elevating amount (position in height) of the shade plate 3040. The control unit 3172 receives and analyzes the signal from the manipulator 3171 and transmits a control signal for controlling the shade plate 3040 to the camera apparatus 10J through the I/F section 3073.

Accordingly, the controller (PC) 3170 controls an angle in the pan direction and an angle in the tilt direction of the camera unit 3030, thereby controlling a posture of the camera unit 3030. In addition, the controller (PC) controls the position in height of the shade plate 3040, thereby adjusting the shading rate.

Next, a method of controlling the camera apparatus 10J will be described.

Firstly, in a storing step, various pieces of information are stored in the memory 3062.

In other words, as illustrated in FIG. 6, the posture information of the camera unit 3030 with respect to the preset number indicating a specific imaging direction and a position in height which is information on the shade plate portion of the shade plate 3040 are stored in the memory 3062.

The above-described information stored in the memory 3062 is set, after the camera apparatus 10J is installed, through the controller 3170 operated by a person away from the place.

In other words, the person causes the camera unit 3030 to be oriented in the intended direction for imaging by the controller 3170, and controls and adjusts the position of the shade plate 3040 so as to reduce the overlapping of the image and so as not to be too dark, as watching the video image captured by the camera unit 3030 through the monitor 3074.

In this manner, after completing adjustment for the posture information indicating the imaging direction of the camera unit 3030 and the information on the shade plate portion of the shade plate 3040, the person stores the posture information on the camera unit 3030 and the information on the shade plate portion of the shade plate 3040 together with the preset number to the memory 3062 using a set button and the like in the manipulator 3171 of the controller 3170.

This process is performed from the preset number 1 to a preset number N, thereby creating a table illustrated in FIG. 6 to store the information in the memory 3062.

As the posture information on the camera unit 3030, for example, there are a pan angle P with respect to the reference position (not illustrated) of the pan table 3024, a tilt angle T of the camera unit 3030, a zoom information Z, a focus information F and the like.

In addition, as the information on the shade plate portion, for example, there is a shading rate M decided by the elevating position of the shade plate 3040.

Here, as illustrated in FIG. 7, the shading rate M can be indicated in a rate (%) of an area of the lens 3301 which is covered by the shade plate 3040.

Therefore, it is considered that the shading rate M=0 when the shade plate 3040 is in the retreat state so that it is possible to obtain the brightness by 100%. This retreat state is easily detected at the high accuracy by the origin sensor 3046 detecting the shade plate 3040.

Next, in a step of controlling when performing the imaging, if the person selects the preset number 1 through the controller 3170, the control unit 3061 performs imaging by causing the camera unit 3030 to be oriented to a subject (front door, for example) of the preset number 1 which is stored in the memory 3062, as illustrated in FIG. 6.

In other words, the control unit 3061 controls the pan table motor 3027 to rotate the pan table 3024 in the pan angle P1 position. In addition, the control unit 3061 controls the tilt motor 3032 to rotate the camera unit 3030 in the tilt angle T1 position. At the same time, zoom and focus control is performed for a zoom position Z1 and a focus position (focal portion) F1.

Moreover, the control unit 3061 controls the shade plate motor 3145 to elevate the shade plate 3040 (step of shading).

Accordingly, it is possible for the preset number 1 to be set in the covered state so as to obtain the shading rate by 10%.

Next, if the person selects the preset number 2 through the controller 3170, the control unit 3061 performs imaging by causing the camera unit 3030 to be oriented to a subject (reception desk, for example) of the preset number 2 which is stored in the memory 3062.

In other words, the control unit 3061 controls the pan table motor 3027 to rotate the pan table 3024 in the pan angle P2 position. In addition, the control unit 3061 controls the tilt motor 3032 to rotate the camera unit 3030 in the tilt angle T2 position. At the same time, zoom and focus control is performed for a zoom position Z2 and a focus position (focal portion) F2.

Moreover, the control unit 3061 controls the shade plate motor 3145 to elevate the shade plate 3040.

Accordingly, it is possible for the preset number 2 to be set in the covered state of the shading rate M=0%. At this time, the origin sensor 3046 detects that the shade plate 3040 is in the original position.

The shade plate 3040 may be controlled manually by not only operating with the preset number but also operating the manipulator 3171 of the controller 3170 as needed by the person watching the monitor 3074.

Next, a captured image in the covered state where a portion of the front surface of the lens 3301 is covered by the shade plate portion 3040 will be described.

As illustrated in FIG. 8, when a magnification of the lens 3301 is set in a telephoto, even if the upper end portion of the lens 3301 is covered by the shade plate 3040, although there is a decrease in an overall amount of light, there is no damage to the image since the light from the subject reaches the image pickup device 3302 through the lower end portion of the lens 3301 which is not covered by the shade plate 3040.

In other words, as illustrated in FIG. 10A, it is possible to shade light L1 above optical axis CBM using the shade plate 3040. Accordingly, only light L2 below the optical axis CBM is incident on the lens 3301, and thus, as illustrated in FIG. 10B, it is possible to shade one of the overlapping (out of focus) images and improve the image quality.

As illustrated in FIG. 9, when the magnification of the lens 3301 is set in a wide-angle, if the upper end portion of the lens 3301 is covered by the shade plate 3040, the light from an upper portion of the subject is blocked by the shade plate 3040 without reaching the image pickup device 3302, thereby resulting in occurrence of the damage to the image (indicated by dotted line in FIG. 9). Therefore, it is necessary to control the position of the shade plate 3040 in accordance with the magnification of the lens 3301.

An operation effect of the camera apparatus 10F in the ninth embodiment will be described.

In the body 3020 which is attached to the ceiling surface 11, the outer dome cover 3050 having transparency is attached. Inside the outer dome cover 3050, the pan table 3024 which is rotatable in the pan direction is attached. In the pan table 3024, the camera unit 3030 which is rotatable in the tilt direction is attached.

The cylindrical shade plate 3040 which partially shades light incident on the camera unit 3030 is attached to the body 3020 capable of being elevated. The shade plate 3040 is attached capable of being elevated through the shade plate elevating unit 3141.

Since the shade plate 3040 is provided being able to elevate through the shade plate elevating unit 3141 to be rotatable 360 degrees around the pan table 3024, that is, around the camera unit 3030, it is possible to shade the front of the camera unit 3030 at all times regardless of the direction of the camera unit 3030 in the pan direction.

Accordingly, when the pan table 3024 an the camera unit 3030 rotate in the pan direction, the shade plate 3040 is positioned in front of the camera unit 3030 at all times, and the shade plate 3040 is elevated in accordance with the rotating of the camera unit 3030 in the tilt direction.

Accordingly, it is possible to obtain the most suitable images by acquiring a shading amount in response to a position of the camera unit 3030 through a simple structure and an easy control.

In addition, in the camera apparatus 10J, the shade plate 3040 is disposed outside the pan table 3024, and thus, it is possible to be easily attached to the body 3020.

In addition, in the camera apparatus 10J, the shade plate 3040 is provided along the outer dome cover 3050 which is attached to the body 3020, and thus, it is possible to cover the outside of the camera unit 3030 by 360 degrees.

In addition, in the camera apparatus 10J, since the shade plate 3040 is provided inside the outer dome cover 3050, the shade plate elevating unit 3141 can be provided inside the outer dome cover 3050, and thus, it is possible to prevent the outer appearance from being degraded.

In addition, in the camera apparatus 10J, the guide protrusion 3142 is provided in the body 3020, and an inclined guide groove 3243 which is provided in the cylindrical shade plate 3040 to be movable along the guide protrusion 3142.

Accordingly, it is possible to elevate the shade plate 3040 with a simple structure by rotating the shade plate 3040 through the gear portion 3244 using the shade plate motor 3145.

Next, an operation effect of a method of controlling the camera apparatus 10J will be described.

In a step of shade plate, the elevating of the shade plate 3040 is controlled. In addition, in the step of controlling, the elevating position of the shade plate 3040 is controlled in response to the rotating of the camera unit 3030.

Accordingly, it is possible to obtain the most suitable images by acquiring a shading amount in response to a position of the camera unit 3030 through a simple structure and an easy control.

In the present embodiment, the direction of the camera and the position of the shade plate 3040 are controlled using the motors, the position of the shade plate 3040 may be manually adjusted without using the motors.

The camera apparatus and the method of controlling a camera apparatus according to the present invention is not limited to the ninth embodiment described above, thereby being possible to be appropriately changed, modified and the like.

Some aspects of the present invention will be described as below.

A first aspect of the present invention provides a camera apparatus including: a cover that has transparency; a rotatable camera unit that is provided inside the cover; a shade plate portion that includes a shade plate capable of partially shading light incident on the camera unit, wherein a position of the shade plate is rotatable; a control unit that is configured to control rotation of the camera unit and the position of the shade plate; and a memory that stores posture information including an imaging direction of the camera unit and positional information on the shade plate in association with each other, wherein the control unit controls a direction of the camera unit based on the posture information stored in the memory and controls the position of the shade plate based on the positional information on the shade plate stored in the memory.

The camera apparatus may be configured so that the memory is controllable through an external controller.

The camera apparatus may be configured so that the shade plate has a pair of sub shade plates separate in a movement direction of the shade plate away from each other by a distance larger than an outer diameter of a camera lens.

A second aspect of the present invention provides a method of controlling a camera apparatus, the method including: rotating a position of a shade plate that partially shades light incident on a rotatable camera unit which is provided inside a cover having transparency; controlling rotation of the camera unit and a position of the shade plate; and storing posture information including an imaging direction of the camera unit and positional information on the shade plate, wherein a direction of the camera unit is controlled based on the stored posture information, and the position of the shade plate is controlled based on the stored positional information.

A third aspect of the present invention provides a camera apparatus including: a cover that has transparency; a rotatable camera unit that is provided inside the cover; and a shade plate portion that includes a plurality of shade plates partially shade light incident on the camera unit, wherein each position of the plurality of shade plates are rotatable, wherein the camera unit is disposed in a position where the light is incident on the camera unit from between the plurality of shade plates.

The camera apparatus may be configured so that the cover is in a sphere shape.

The camera apparatus may be configured so that the camera unit is rotatable in a tilt direction, and a rotating shaft of the camera unit in the tilt direction is offset from a spherical center of the cover in a direction of an apex of the cover.

The camera apparatus may be configured so that the plurality of shade plates are disposed in a vertical direction with respect to an optical axis of the camera unit.

The camera apparatus may be configured so that the plurality of shade plates are individually controlled.

The camera apparatus may be configured so that the plurality of shade plates are in arc shapes.

A fourth aspect of the present invention provides a method of controlling a camera apparatus, wherein a camera unit is disposed between a plurality of shade plates that partially shade light incident on a rotatable camera unit which is provided inside a cover having transparency, and the method includes a step of rotating positions of a plurality of shade plates.

A fifth aspect of the present invention provides a camera apparatus including: an outer dome cover that has transparency; a camera unit that is provided inside the outer dome cover and rotatable in a tilt direction; a pan table to which the camera unit is attached, wherein the pan table is rotatable in a pan direction; a shade plate that partially shades light incident on the camera unit; and a shade plate elevating unit that is attached to the pan table and supports the shade plate to be movable in an orthogonal direction with respect to the pan table.

The camera apparatus may be configured by further including an inner dome cover that is provided to the pan table and covers partially covers the camera unit, wherein the shade plate is attached to the inner dome cover.

The camera apparatus may be configured so that the shade plate elevating unit includes a guide portion which guides elevating of the shade plate, a gear portion which elevates the shade plate, and a motor which drives the gear portion.

A sixth aspect of the present invention provides a method of controlling a camera apparatus, the method including: elevating a position of a shade plate that partially shades light incident on a rotatable camera unit which is provided inside an outer dome cover having transparency with respect to a pan table rotatable in a pan direction; and controlling rotation of the camera unit and an elevating position of the shade plate with respect to the pan table.

A seventh aspect of the present invention provides a camera apparatus including: a body to be attached to an attachment surface; an outer dome cover that has transparency attached to the body; a camera unit that is provided inside the outer dome cover and rotatable in a tilt direction; a pan table to which the camera unit is attached, wherein the pan table is rotatable in a pan direction; a cylindrical shade plate that is attached to the body to be elevated and partially shades light incident on the camera unit; and a shade plate elevating unit that is attached to the body and supports the shade plate to be movable in an orthogonal direction with respect to the pan table.

The camera apparatus may be configured so that the shade plate is disposed outside the pan table.

The camera apparatus may be configured so that the shade plate is provided along the outer dome cover.

The camera apparatus may be configured so that the shade plate is provided inside the outer dome cover.

The camera apparatus may be configured so that the shade plate elevating unit includes a guide protrusion provided in the body, an inclined guide groove provided in the shade plate to be movable along the guide protrusion, a gear portion which rotates the shade plate, and a motor which drives the gear portion.

An eighth aspect of the present invention provides a method of controlling a camera apparatus, the method including: elevating a position of a cylindrical shade plate that partially shades light incident on a camera unit which is rotatable in a tilt direction with respect to a body attached to an attachment surface; and controlling an elevating position of the shade plate in response to rotation of the camera unit.

In a camera apparatus and a method of controlling a camera apparatus according to the aspects of the present invention, a control unit determines a direction of a camera unit based on posture information stored in a memory and determines a shading rate of a shade plate based on information on a shade plate portion stored in the memory. Accordingly, it is possible to obtain the most suitable image, thereby achieving improvement in monitoring ability.

In addition, in the camera apparatus and the method of controlling a camera apparatus according to the aspects of the present invention, the camera unit and the shade plate portion are covered by a transparent cover. The cover is in a shape in which one and the other on opposite sides having an optical axis of the camera unit as a center are different from each other at penetration angle in accordance with rotating about a second rotating shaft of the camera unit. For this reason, light passing through one side of the optical axis and light passing through the other are different from each other in focal distance, resulting in overlapped and blurred images. Therefore, the light passing through one or the other on opposite sides having the optical axis of the camera unit as the center is shaded by appropriately rotating the shade plate using a shade plate drive unit, and thus, it is possible to prevent the image from overlapping and improve image quality.

In the camera apparatus and the method of controlling a camera apparatus according to the aspects of the present invention, in a pan table in which the camera unit rotatable in a tilt direction is provided, the shade plate which partially shades the light incident on the camera unit is provided being able to elevate through a shade plate elevating unit. A control unit controls a direction of the camera unit based on posture information which is stored in the memory and controls the shade plate elevating unit based on positional information on the shade plate which is stored in the memory. The shade plate rotates integrally with the camera unit in a pan direction, and the shade plate is elevated in response to the rotating of the camera unit in the tile direction. Therefore, it is possible to obtain the most suitable images by acquiring a shading amount in response to a position of the camera through a simple structure and an easy control.

In the camera apparatus and the method of controlling a camera apparatus according to the aspects of the present invention, since the shade plate is provided being able to elevate through the shade plate elevating unit to be rotatable 360 degrees around the pan table, that is, around the camera unit, it is possible to shade the front of the camera unit at all times regardless of the direction of the camera unit in the pan direction. Then, the control unit controls the direction of the camera unit based on the posture information which is stored in the memory and controls the shade plate elevating unit based on the positional information on the shade plate which is stored in the memory. Accordingly, even if the pan table and the camera unit rotate in the pan direction, the shade plate is positioned in front of the camera unit at all times, and the shade plate is elevated in accordance with the rotating of the camera unit in the tilt direction. Therefore, it is possible to obtain the most suitable images by acquiring the shading amount in response to the position of the camera unit through the simple structure and the easy control.

The present application is based on and claims the benefit of Japanese patent application No. 2013-041211 filed on Mar. 1, 2013, Japanese patent application No. 2013-051990 filed on Mar. 14, 2013, Japanese patent application No. 2013-174519 filed on Aug. 26, 2013, Japanese patent application No. 2013-174520 filed on Aug. 26, 2013 and Japanese patent application No. 2013-199860 filed on Sep. 26, 2013, the contents of which are incorporated herein by reference in its entirety.

What is claimed is:

1. A camera apparatus comprising:
a cover that has transparency;
a rotatable camera that is provided inside the cover;
a shade plate configured to partially shade light incident on the camera, wherein the shade plate is rotatable so as to cover a portion of a periphery of a camera lens while leaving another portion of the periphery of the camera lens uncovered;
a controller that controls rotation of the camera and a position of the shade plate; and
a memory that stores posture information including an imaging direction of the camera and positional information on the shade plate in association with each other, wherein
the controller controls a direction of the camera based on the posture information stored in the memory and controls the position of the shade plate based on the positional information on the shade plate stored in the memory.

2. The camera apparatus according to claim 1, wherein the shade plate comprises a pair of sub shade plates spaced from each other in a movement direction of the shade plate by a distance larger than an outer diameter of the camera lens.

3. The camera apparatus according to claim 1, wherein the camera is rotatable in a tilt direction, and a rotating shaft of the camera in the tilt direction is offset from a spherical center of the cover in a direction of an apex of the cover.

4. A method of controlling a camera apparatus, the method comprising:
rotating a shade plate that partially shades light incident on a rotatable camera which is provided inside a cover having transparency the shade plate rotating to cover a portion of a periphery of a camera lens while leaving another portion of the periphery of the camera lens uncovered;
controlling rotation of the camera and a position of the shade plate; and
storing posture information including an imaging direction of the camera and positional information on the shade plate in association with each other, wherein
a direction of the camera is controlled based on the stored posture information, and the position of the shade plate is controlled based on the stored positional information.

5. A camera apparatus comprising:
a cover that has transparency;
a rotatable camera that is provided inside the cover; and
a plurality of shade plates that partially shade light incident on the camera, wherein each of the plurality of shade plates is rotatable such that the plurality of shade plates cover a portion of a periphery of a camera lens while leaving another portion of the periphery of the camera lens uncovered, wherein
the camera is disposed in a position where the light is incident on the camera from between the plurality of shade plates.

6. The camera apparatus according to claim 5, wherein the camera is rotatable in a tilt direction, and a rotating shaft of the camera in the tilt direction is offset from a spherical center of the cover in a direction of an apex of the cover.

7. The camera apparatus according to claim 5, wherein the plurality of shade plates are disposed in a vertical direction with respect to an optical axis of the camera.

8. The camera apparatus according to claim 5, wherein the plurality of shade plates are individually controlled.

9. The camera apparatus according to claim 5, wherein the plurality of shade plates have arc shapes.

10. A method of controlling a camera apparatus, having a rotatable camera that is disposed between a plurality of shade plates that partially shade light incident on the camera, and is provided inside a cover having transparency,
the method comprising moving the plurality of shade plates such that the plurality of shade plates cover a portion of a periphery of a camera lens while leaving another portion of the periphery of the camera lens uncovered.

11. A camera apparatus comprising:
an outer dome cover that has transparency;
a camera that is provided inside the outer dome cover and is rotatable in a tilt direction;
a pan table to which the camera is attached, wherein the pan table is rotatable in a pan direction;
a shade plate that partially shades light incident on the camera; and
a shade plate elevator that is attached to the pan table and supports the shade plate to be movable in an orthogonal direction with respect to the pan table.

12. The camera apparatus according to claim 11, further comprising
an inner dome cover that is provided to the pan table and partially covers the camera, wherein
the shade plate is attached to the inner dome cover.

13. The camera apparatus according to claim 11, wherein the shade plate elevator includes a guide that guides elevating of the shade plate, a gear that elevates the shade plate, and a motor that drives the gear.

14. A camera apparatus comprising:
a body to be attached to an attachment surface;
an outer dome cover that has transparency and is attached to the body;
a camera that is provided inside the outer dome cover and is rotatable in a tilt direction;
a pan table to which the camera is attached, wherein the pan table is rotatable in a pan direction;
a cylindrical shade plate that is attached to the body to be elevated and partially shades light incident on the camera; and
a shade plate elevator that is attached to the body and supports the shade plate to be movable in an orthogonal direction with respect to the pan table.

15. The camera apparatus according to claim 14, wherein the shade plate is disposed outside the pan table.

16. The camera apparatus according to claim 14, wherein the shade plate is provided along the outer dome cover.

17. The camera apparatus according to claim 14, wherein the shade plate is provided inside the outer dome cover.

18. The camera apparatus according to claim 14, wherein the shade plate elevator includes a guide protrusion provided on the body, an inclined guide groove provided in the shade plate to be movable along the guide protrusion, a gear that rotates the shade plate, and a motor that drives the gear.

19. The camera apparatus according to claim 1, wherein the shade plate is rotatable about an axis extending in a direction perpendicular to the optical axis of the camera.

20. The camera apparatus according to claim 5, wherein the uncovered portion of the periphery of the camera lens comprises two spaced portions.

* * * * *